(12) United States Patent
Madisetti et al.

(10) Patent No.: US 11,704,663 B2
(45) Date of Patent: Jul. 18, 2023

(54) METHOD AND SYSTEM FOR BLOCKCHAIN-BASED VEHICLE IDENTIFIERS AND WALLETS FOR DECENTRALIZED PAYMENTS

(71) Applicant: Vijay Madisetti, Johns Creek, GA (US)

(72) Inventors: Vijay Madisetti, Johns Creek, GA (US); Arshdeep Bahga, Chandigarh (IN)

(73) Assignee: Vijay Madisetti, Johns Creek, GA (US)

( * ) Notice: Subject to any disclaimer, the term of this patent is extended or adjusted under 35 U.S.C. 154(b) by 0 days.

(21) Appl. No.: 17/741,761

(22) Filed: May 11, 2022

(65) Prior Publication Data
US 2022/0374875 A1     Nov. 24, 2022

Related U.S. Application Data

(63) Continuation-in-part of application No. 15/830,099, filed on Dec. 4, 2017, now Pat. No. 11,538,031.

(60) Provisional application No. 63/195,205, filed on Jun. 1, 2021, provisional application No. 63/192,028, filed on May 23, 2021, provisional application No. 63/189,284, filed on May 17, 2021, provisional application No. 62/479,966, filed on Mar. 31, 2017.

(51) Int. Cl.
*G06Q 20/36*     (2012.01)
*G06Q 20/32*     (2012.01)
*G06Q 20/38*     (2012.01)

(52) U.S. Cl.
CPC ..... *G06Q 20/3678* (2013.01); *G06Q 20/3278* (2013.01); *G06Q 20/389* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 10,333,706 B2 * | 6/2019 | Smith | G06Q 20/308 |
| 10,762,506 B1 * | 9/2020 | Cash | G06Q 20/206 |
| 10,885,501 B2 | 1/2021 | Uhr et al. | |
| 11,127,019 B2 * | 9/2021 | Xiu | G06Q 20/409 |
| 11,468,439 B2 * | 10/2022 | Durvasula | G06Q 20/3823 |

(Continued)

OTHER PUBLICATIONS

R. F. Cunningham, "Smart card applications in integrated transit fare, parking fee and automated toll payment systems—the MAPS concept," Conference Proceedings National Telesystems Conference 1993, 1993, pp. 21-25, doi: 10.1109/NTC.1993.293015. (Year: 1993).*

(Continued)

*Primary Examiner* — Jacob C. Coppola
*Assistant Examiner* — Eduardo Castilho
(74) *Attorney, Agent, or Firm* — Daniel C. Pierron; Widerman Malek, PL

(57) ABSTRACT

A system for blockchain-based unique identifiers and decentralized payments including a first computerized system that includes a unique identifier, a second computerized system including a gateway device that can communicate with a blockchain network, generate a transaction to transfer a token value responsive to receiving the unique identifier and synchronize the generated transaction to the blockchain network. One of the first computerized system and the second computerized system is installed in a vehicle and the other is installed in a fixed structure.

22 Claims, 23 Drawing Sheets

(56) References Cited

U.S. PATENT DOCUMENTS

| | | | | |
|---|---|---|---|---|
| 2011/0084807 | A1* | 4/2011 | Logan | G08B 21/22 |
| | | | | 340/10.1 |
| 2015/0317842 | A1* | 11/2015 | Evans | G06Q 20/3278 |
| | | | | 705/13 |
| 2016/0330034 | A1* | 11/2016 | Back | G06Q 20/065 |
| 2017/0046669 | A1* | 2/2017 | Chow | G06Q 20/29 |
| 2017/0124534 | A1* | 5/2017 | Savolainen | G06Q 20/065 |
| 2017/0317833 | A1 | 11/2017 | Smith et al. | |
| 2018/0121892 | A1* | 5/2018 | Dwivedi | G06Q 20/065 |
| 2018/0220278 | A1* | 8/2018 | Tal | G06Q 20/36 |
| 2019/0034917 | A1* | 1/2019 | Nolan | G06Q 20/3278 |
| 2019/0057372 | A1* | 2/2019 | Batten | G06Q 20/386 |
| 2019/0090090 | A1* | 3/2019 | Doyal | G06Q 20/3224 |
| 2019/0347626 | A1* | 11/2019 | Wullschleger | G06Q 20/3674 |
| 2020/0005404 | A1* | 1/2020 | Patterson | G06Q 20/0855 |
| 2020/0334677 | A1* | 10/2020 | Hari | G06Q 20/065 |
| 2021/0174334 | A1* | 6/2021 | Valencia | G06Q 20/3278 |

OTHER PUBLICATIONS

G. Yan, W. Yang, D. B. Rawat and S. Olariu, "SmartParking: A Secure and Intelligent Parking System," in IEEE Intelligent Transportation Systems Magazine, vol. 3, No. 1, pp. 18-30, Spring, 2011, doi: 10.1109/MITS.2011.940473. (Year: 2011).*

L. Mainetti, L. Palano, L. Patrono, M. L. Stefanizzi and R. Vergallo, "Integration of RFID and WSN technologies in a Smart Parking System," 2014 22nd International Conference on Software, Telecommunications and Computer Networks (SoftCOM), 2014, pp. 104-110, doi: 10.1109/SOFTCOM.2014.7039099. (Year: 2014).*

A. Wahab and P. Maguire "Smart Parking: IoT and Blockchain,", 2019, https://doi.org/10.48550/arXiv.1912.01697 (Year: 2019).*

A. Shukla, P. Bhattacharya, S. Tanwar, N. Kumar and M. Guizani, "DwaRa: A Deep Learning-Based Dynamic Toll Pricing Scheme for Intelligent Transportation Systems," in IEEE Transactions on Vehicular Technology, vol. 69, No. 11, pp. 12510-12520, Nov. 2020, doi: 10.1109/TVT.2020.3022168. (Year: 2020).*

C. Peng, C. Wu, L. Gao, J. Zhang, KL. Alvin Yau and Y. Ji, "Blockchain for Vehicular Internet of Things: Recent Advances and Open Issues. Sensors (Basel),", 2020, 20(18):5079. Published Sep. 7, 2020. doi:10.3390/s20185079 (Year: 2020).*

P. C. Bartolomeu, E. Vieira and J. Ferreira, "Pay as You Go: A Generic Crypto Tolling Architecture," in IEEE Access, vol. 8, pp. 196212-196222, 2020, doi: 10.1109/ACCESS.2020.3034299. (Year: 2020).*

Hawrylak et al., "RFID Tags," in The Internet of Things: From RFID to the Next-Generation Pervasive Networked Systems, 2008, Ukraine: CRC Press. (Year: 2008).*

Back et al., "Enabling Blockchain Innovations with Pegged Sidechains," 2014, (Year: 2014).*

Finkenzeller—RFID Handbook, Third Edition, John Wiley & Sons Ltd, pp. 194-211 (Year: 2010).*

S. Ahmed, Soaibuzzaman, M. S. Rahman and M. S. Rahaman, "A Blockchain-Based Architecture for Integrated Smart Parking Systems," 2019 IEEE International Conference (PerCom Workshops), Kyoto, Japan, 2019, pp. 177-182, doi: 10.1109/PERCOMW.2019. 8730772. (Year: 2019).*

Notice of Allowance received in related pending U.S. Appl. No. 15/830,099.

* cited by examiner

```
contract Seal {
        address public owner;
        uint public hashedData;

function Seal(uint _hashedData) {
                owner = msg.sender;
                hashedData = _hashedData;
        }
}
```
350

```
contract Certification {
        address public owner;
        address public sealedUserRecordAddress;
        address public sealedVerificationRecordAddress;
        uint public token;
        uint public tokenExpires;

function Certification(address _sealedUserRecordAddress,
                        address _sealedVerificationRecordAddress
                                uint _token, uint _tokenExpires) {
                owner = msg.sender;
                sealedUserRecordAddress = _sealedUserRecordAddress;
                sealedVerificationRecordAddress = _sealedVerificationRecordAddress;
                token = _token;
                tokenExpires = _tokenExpires;
        }
}
```
352

FIG. 4

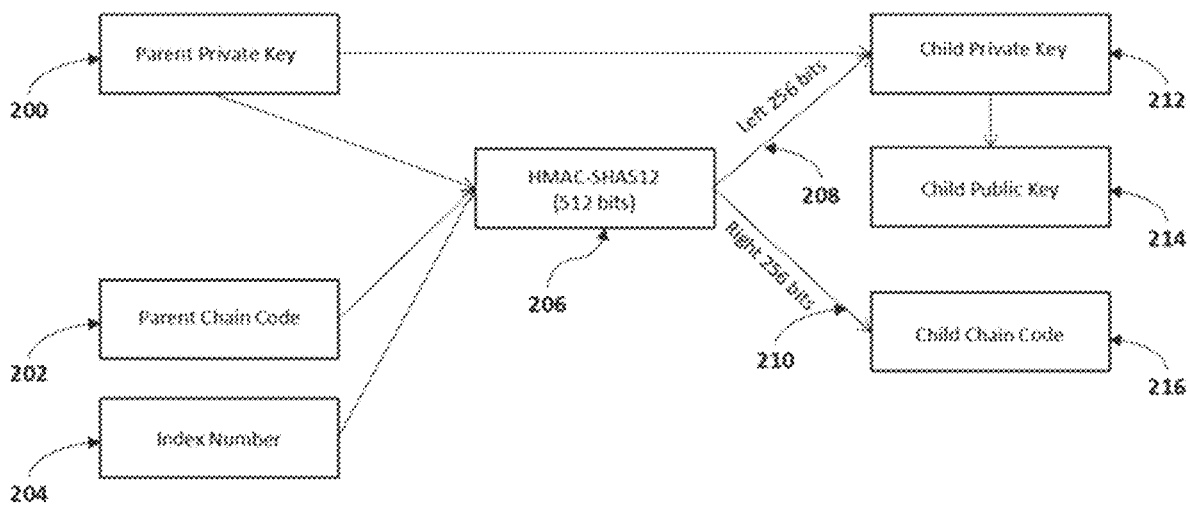

FIG. 5

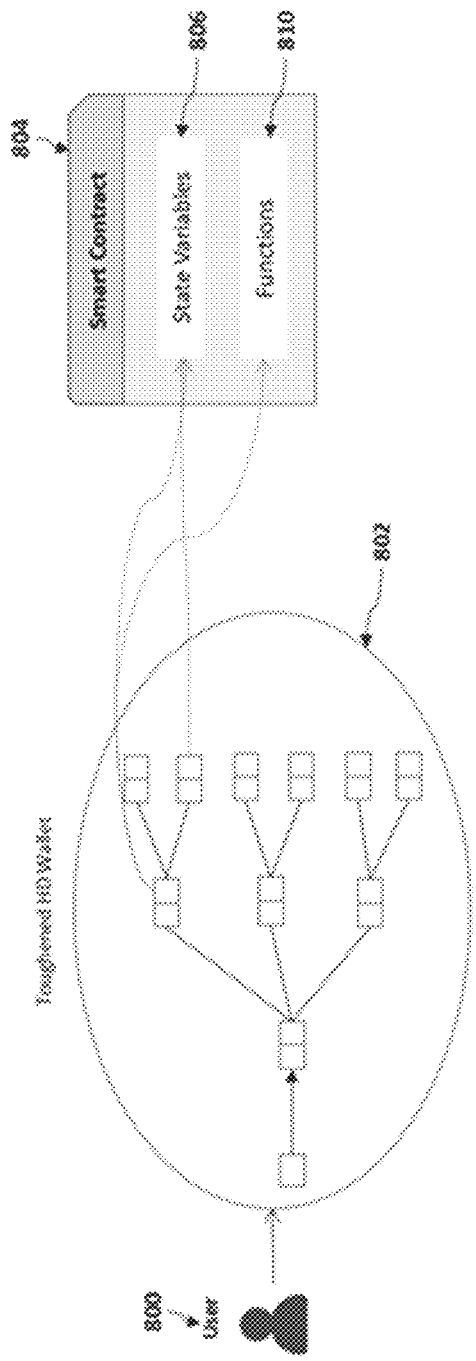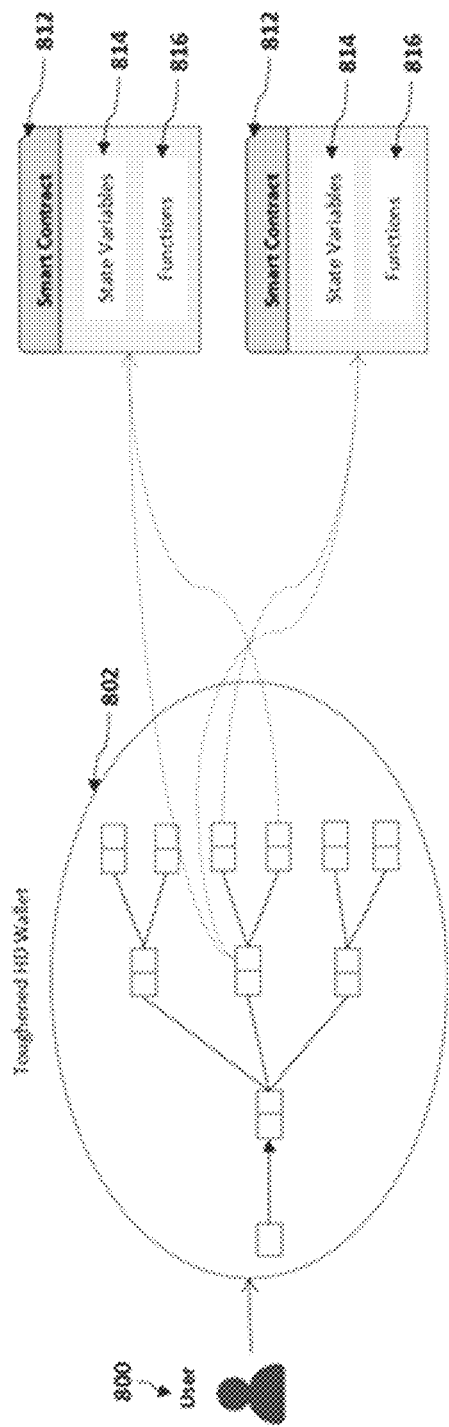
FIG. 12

METHOD AND SYSTEM FOR BLOCKCHAIN-BASED VEHICLE IDENTIFIERS AND WALLETS FOR DECENTRALIZED PAYMENTS

RELATED APPLICATIONS

This application claims priority under 35 U.S.C. § 119(e) of U.S. Provisional Patent Application Ser. No. 63/189,284 filed on May 17, 2021 and titled Method and System for Blockchain-Based Vehicle Identifiers and Wallets. This application also claims priority under 35 U.S.C. § 119(e) of U.S. Provisional Patent Application Ser. No. 63/192,028 filed on May 23, 2021 and titled Method and System for Blockchain-based Vehicle Identification and Payments— CarCard and CarTokens. This application also claims priority under 35 U.S.C. § 119(e) of U.S. Provisional Patent Application Ser. No. 63/195,205 filed on Jun. 1, 2021 and titled CarCoins and CarCard for Car-Based Payments Using Vehicle DIDs and Blockchain. This application also is a continuation-in-part application of and claims priority under 35 U.S.C. § 120 of U.S. patent application Ser. No. 15/830,099 filed on Dec. 4, 2017 and titled Method and System for Identity and Access Management for Blockchain Interoperability, which in turn claims priority under 35 U.S.C. § 119(e) of U.S. Provisional Patent Application Ser. No. 62/479,966 filed on Mar. 31, 2017 and titled Method and System for Identity and Access Management for Blockchain Interoperability. The contents of these applications are incorporated herein by reference.

FIELD OF THE INVENTION

The present invention relates to identity and access management for blockchain interoperability.

BACKGROUND

Blockchain is a distributed and public ledger which maintains records of all the transactions. A blockchain network is a truly peer-to-peer network and it does not require a trusted central authority or intermediaries to authenticate or to settle the transactions or to control the network infrastructure. Users can interact and transact with the blockchain networks through Externally Owned Account (EOAs), which are owned and controlled by the users. Each EOA has a balance (in certain units of a Cryptocurrency associated with the Blockchain network) associated with it. EOAs do not have any associated code. All transactions on a blockchain network are initiated by EOAs. These accounts can send transactions to other EOAs or contract accounts. Another type of accounts support by second generation programmable Blockchain platforms are the Contract Accounts. A Contract Account is created and owned by an EOA and is controlled by the associated contract code which is stored with the account. The contract code execution is triggered by transactions sent by EOAs or messages sent by other contracts.

Blockchain networks can either be public or private. Public blockchain networks are free and open to all and any user can create an account and participate in the consensus mechanism on a public blockchain and view all the transactions on the network. Private blockchain networks are usually controlled and operated by a single organization and the transactions can be viewed only by the users within the organization. Public blockchain networks are usually unpermissioned or permissionless, as any node can participate in consensus process. Some public blockchain networks adopt a permissioned model where the consensus process is controlled by a pre-selected set of nodes. Private blockchain networks usually adopt the permissioned model. While public blockchain networks can be considered as fully decentralized, private blockchain networks are partially decentralized.

Organizations can have multiple private blockchain networks where each network is dedicated to a specific use case or department or business vertical. The blockchain networks within an organization may be created either using the same blockchain platform or technology or with different platforms or technologies.

On each blockchain network, a user can create multiple Externally Owned Accounts (EOAs). Each Externally Owned Account (EOA) has a public-private keypair associated with it. The account address is derived from the public key. When a new EOA is created, a keyfile is created which has the public and private keys associated with the account. The private key is encrypted with the password which is provided while creating the account. For sending transactions to other accounts, the private key and the account password are required.

Existing Blockchain platforms lack identity management beyond the blockchain accounts and there is no way to know if two blockchain accounts belong to the same person. Blockchain applications can be prone to Sybil attacks where the attacker can create a large number of pseudonymous identities and then use them to gain a large influence on the network. In existing Blockchain platforms, there is no way to securely link a blockchain account to a real-user. Prior art linking blockchain accounts to real users is based on know your customer (KYC) processes that require the user to provide KYC documents such as a government issued identity card (such as passport or driving license). The KYC processes require manual verification by the platform or application team. When using multiple private and/or permissioned blockchain networks within a single organization, there is no way for a user to work on multiple blockchain networks while maintaining the same identity. For multiple blockchain networks within an organization or different applications deployed on the same blockchain network, existing solutions require the KYC process to be completed separately either for each blockchain network or for each application.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a system for blockchain-based vehicle identifiers and decentralized payments comprising a first computerized system that comprises a first controller, a vehicle identifier, and a first wireless communication device. The system further comprises a second computerized system comprising a second wireless communication device and a gateway device configured to communicate with a blockchain network via the second wireless communication device. One of the first computerized system and the second computerized system is installed in a vehicle and the other of the first computerized system and the second computerized system is installed in a fixed structure. Upon receipt of the vehicle identifier by the gateway device of the second computerized system, a transaction to transfer a token value from a wallet associated with one of the first computerized system and the second computerized system to a wallet associated with the other of the first computerized system and the second computerized system is generated by the gateway device and synchronized to the blockchain network.

In some embodiments, the first computerized system may comprise a short-range wireless device that is one of passive and battery-assisted passive, defining a VID device, and configured to transmit the vehicle identifier responsive to receiving a short-range signal seeking the vehicle identifier, defining an interrogator signal. The second computerized system may comprise a second controller operable to transmit the interrogator signal, receive the signal from the VID device, and transmit the vehicle identifier to the gateway device. In further embodiments, the VID device may be an RFID tag, and the second controller may comprise an RFID reader. In other embodiments, the second controller may be positioned within a vehicle parking indicator and further comprise a first network communication device, the gateway device may be positioned within a geographical area delineating a vehicle parking area and comprising the vehicle parking indicator, defining a gateway location, the gateway device comprising a second network communication device configured to communicate with the first network communication device and receive the vehicle identifier thereby, and the second wireless communication device is positioned at one of the vehicle parking indicator and the gateway location. In further embodiments, the second wireless communication device may be positioned at the gateway location, the second computerized system may comprise a third wireless communication device positioned at the vehicle parking indicator, and the gateway device may be further operable to synchronize the transaction to the blockchain network via at least one of the second wireless communication device and the third wireless communication device.

In some embodiments, the gateway device may be configured to operate a node of the blockchain network. In further embodiments, the gateway device may be configured to maintain a local database of messages and tokens exchanged between the first computerized system and the second computerized system and synchronize the local database with the blockchain network.

In some embodiments, the first controller, the vehicle identifier, and the first wireless communication device may be comprised by a computerized device comprised by a vehicle, defining a vehicle computerized device. In further embodiments, the vehicle computerized device may further comprise a short-range wireless communication device configured to transmit the vehicle identifier and the gateway device may comprise a wireless communication device configured to receive the vehicle identifier from the wireless communication device comprised by the vehicle computerized device.

In some embodiments, the blockchain network to which the gateway device is configured to synchronize the transaction may be a permissioned private blockchain network and the gateway device may be further configured to perform a checkpointing process to synchronize transactions synchronized to the permissioned private blockchain network to a public blockchain network. In some embodiments, the gateway device may be configured to synchronize the transaction to the blockchain network using a cloud-based oracle. In some embodiments, the gateway may be positioned in a geographic area delineated as at least one of a stand-alone vehicle parking area, a vehicle parking area associated with a building, and a toll collection area.

Further embodiments of the invention may be directed to a decentralized payment method for blockchain-based vehicle identifiers, the method comprising: generating a short-range wireless interrogator signal using a first short-range wireless transceiver device, receiving a response to the short-range wireless interrogator signal comprising a vehicle identifier, generating a transaction to transfer a token value from a wallet associated with a vehicle on a blockchain network to a receiving wallet, defining a generated transaction by a gateway device, and synchronizing the generated transaction to the blockchain network via a first wireless communication device.

In some embodiments, the gateway device may operate a node on the blockchain network and synchronizing the generated transaction may comprise publishing the transaction on the blockchain network. In further embodiments, the gateway device may maintain a local database of messages and tokens exchanged between the gateway device and vehicles interacting therewith, synchronizing the generated transaction may comprise synchronizing the local database with the blockchain network, and the method may further comprise adding the generated transaction to the local database.

In some embodiments, the blockchain network to which the generated transaction is synchronized may be a permissioned private blockchain network, and the method may further comprise performing a checkpointing process to synchronize transactions synchronized to the permissioned private blockchain network to a public blockchain network.

BRIEF DESCRIPTION OF THE DRAWINGS

FIG. 4 is a reference implementation of Seal and Certification smart contracts, according to an embodiment of the invention.

FIG. 5 is an illustration of hardened derivation of a child key in a Hierarchical Deterministic wallet as proposed in BIP0032.

FIG. 12 is an illustration of the examples of roles based access control, with role assignment to individual keys belonging to a user, according to an embodiment of the invention.

DETAILED DESCRIPTION OF THE INVENTION

Figure 1:
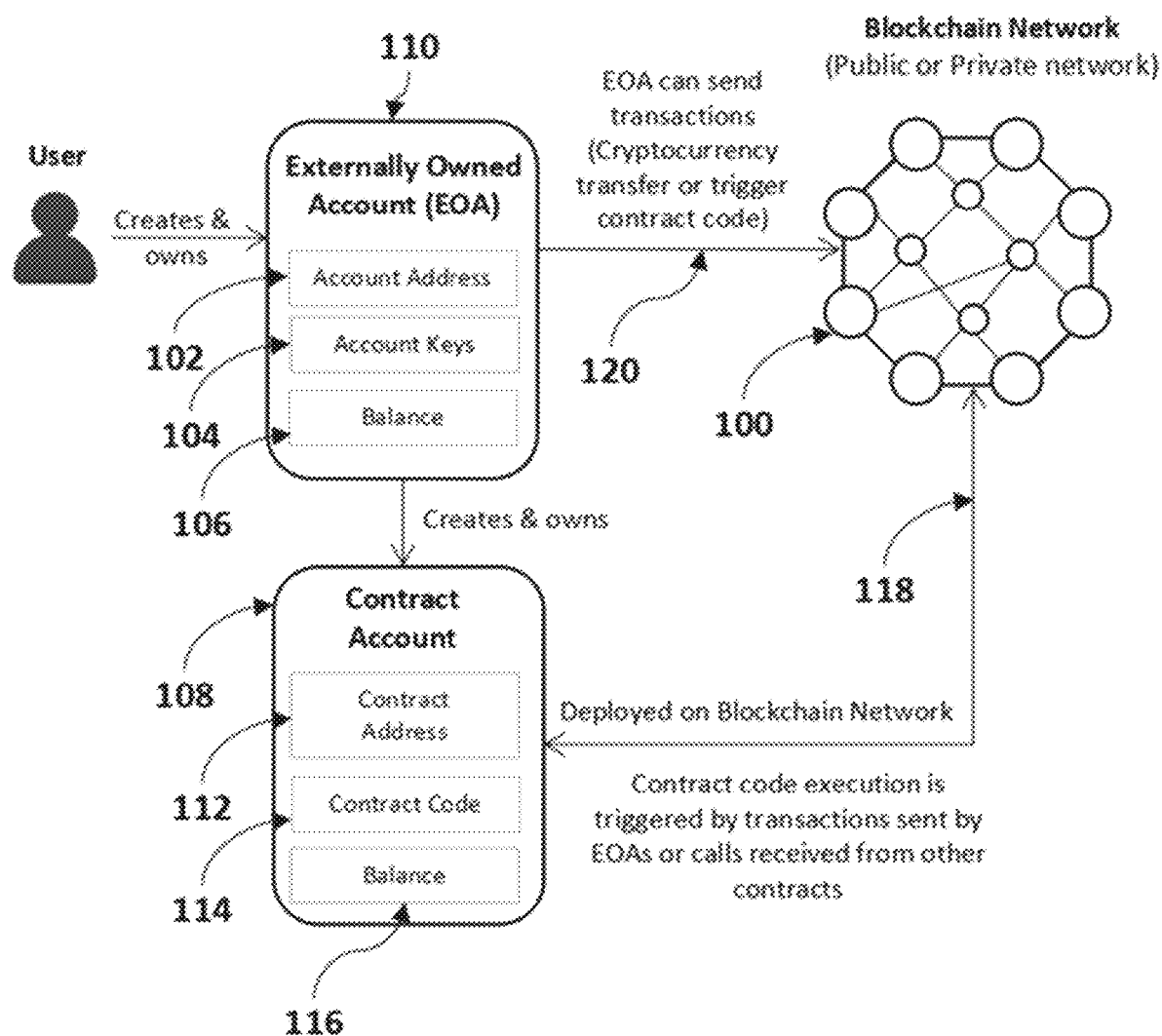
FIG. 1 is an illustration of the blockchain account types and interactions.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Referring to FIGS. 1-12, an Identity and Access Management system for Blockchain Interoperability according to an embodiment of the present invention is now described in detail. Throughout this disclosure, the present invention may be referred to as a Blockchain Identity and Access Management (B-IAM) system, a blockchain identity system, blockchain access management system, a blockchain access control system, a device, a system, a product, and a method. Those skilled in the art will appreciate that this terminology is only illustrative and does not affect the scope of the invention. Moreover, those skilled in the art will appreciate that all processes described herein may be performed by a computing device comprising, but not limited to, a network communication device operable to communicate across a network, such as a wide area network, including the Internet, a processor in communication with the networking communication device and operable to perform computing functions, and a data store capable of receiving, storing, and providing information to each of the network communication device and the processor.

Referring now to FIG. 1, for example, and without limitation, blockchain account types and interactions between them, are described in more detail. Blockchain is a distributed and public ledger which maintains records of all the transactions. A blockchain network 100 is a truly peer-to-peer network and it does not require a trusted central authority or intermediaries to authenticate or to settle the transactions or to control the network infrastructure. Users can interact and transact with the blockchain networks through Externally Owned Account (EOAs) 110, which are owned and controlled by the users. Each EOA 110 has an account address 102, account public-private keys 104 and a balance 106 (in certain units of a Cryptocurrency associated with the Blockchain network) associated with it. EOAs do not have any associated code. All transactions 120 on a blockchain network are initiated by EOAs. These accounts can send transactions to other EOAs or contract accounts. Another type of accounts support by second generation programmable Blockchain platforms are the Contract Accounts 108. A Contract Account 108 is created and owned by an EOA 110, is located at a contract address 112, and is controlled by the associated contract code 114 which is stored with the contract account 108. Additionally, the contract account 108 may comprise a balance 116, which may be identical to the balance 106 of the EOA 110. The contract code 112 execution is triggered by transactions 118 sent by EOAs or messages sent by other contracts.

Figure 2:
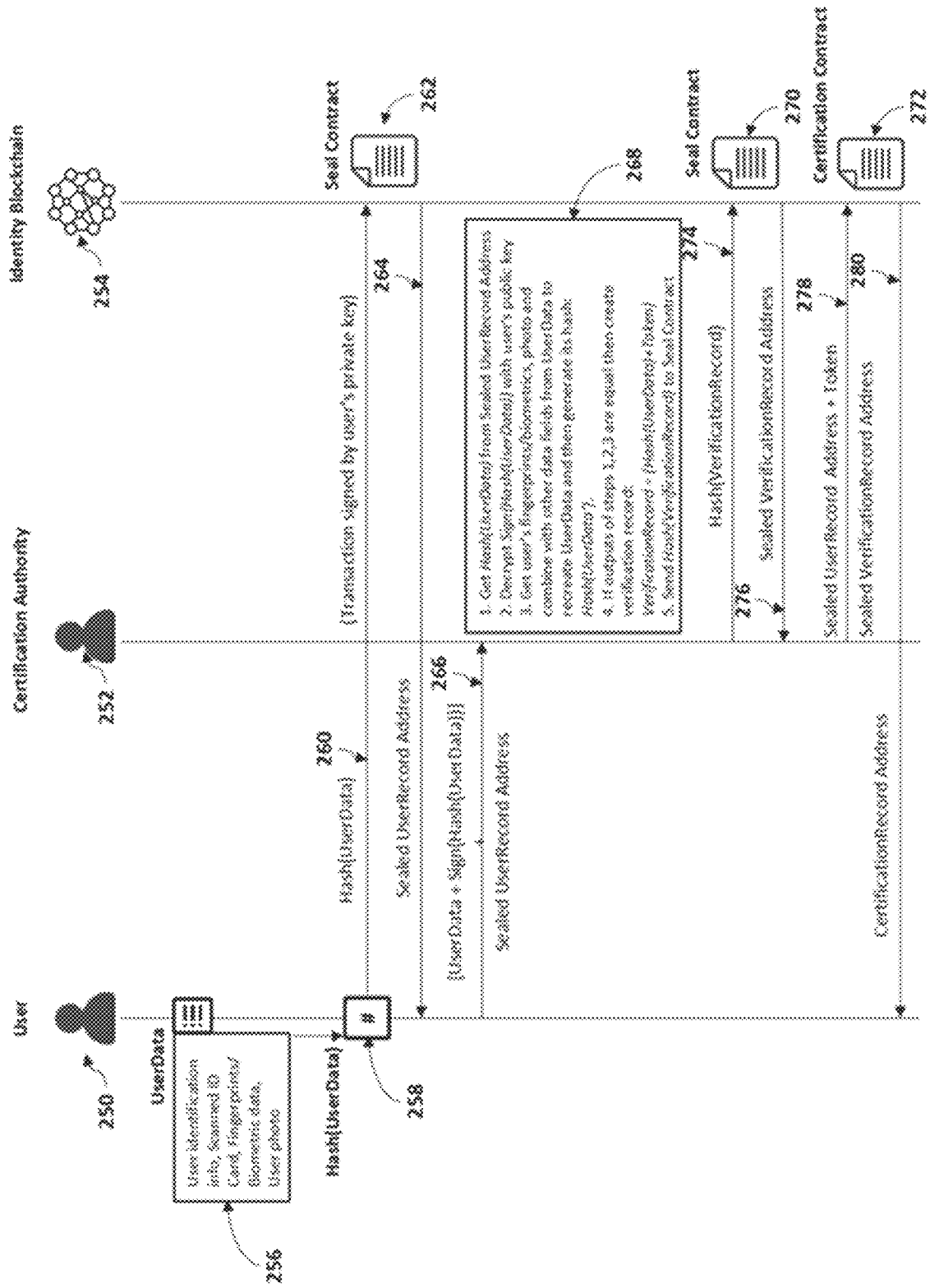
FIG. 2 is an illustration of the user registration and certification process, according to an embodiment of the invention.

An embodiment of the invention provides a system and associated methods for securely linking blockchain accounts to real users. Referring to FIG. 2, the user registration and certification process, for securely linking blockchain accounts to real users, is described in more detail. User registration process is done to link a real user 250 to one or more blockchain accounts. For the registration process, the user 250 either uses a registration application either on mobile or a desktop computer. In the registration application, the user provides the identification information (including fields such as name, address, date of birth and other identification information), scanned identification card (such as a driver license, passport or other types of ID cards), fingerprints and other biometric data, user photo, and any other type of data that can be used to identify the user. Each data field provided by the user in the registration application (collectively referred to as the 'UserData' 256) is hashed using a one-way hash function 258, generating hashed data 260. The registration application then creates a new smart contract from this hashed data 260, which is referred to as the 'Seal Contract' 262. The transaction to create this new Seal Contract 262 on the blockchain network is signed by the user's private key. The Seal Contract 262 maintains a record of the hashed user data and the user's address on the blockchain network. A separate private and/or permissioned blockchain 254 may be used for user identity management, where the Seal Contract is deployed. When the transaction to create the new Seal Contract is mined, the user gets an address of the contract, which is referred to as the 'Sealed UserRecord Address' 264. This completes the user registration process.

The next step is the certification process, in which the user provides the 'UserData', digitally signed and hashed 'UserData', and the 'Sealed UserRecord Address' 266 to a certification authority 252. The data is signed by the user's private key. This data may be shared with the certification authority 252 over an encrypted and secure channel, so that only the certification authority can decrypt and access the data. The certification authority 252 then verifies if the UserRecord has been created and sealed by the user 250 and if the user own's the record and the associated Seal Contract 262 by performing a certification process 268. The steps involved in the certification process 268 may include, as follows:

1. Get Hash(UserData) from Sealed UserRecord Address;
2. Decrypt Sign(Hash(UserData)) with user's public key;
3. Get user's fingerprints and/or biometric data, user photo and combine with other data fields from UserData to recreate UserData and then generate its hash: Hash(UserData');
4. If outputs of steps 1, 2, 3 above are equal then create verification record as follows: VerificationRecord= (Hash(UserData)+Token);
5. Create a new Seal Contract with Hash(VerificationRecord) 274 as the input data.

The transaction to create this new Seal Contract 270 on the blockchain is signed by the certification authority's private key. When the transaction to create the new Seal Contract 270 is mined, the certification authority 252 gets an address of the contract, which is referred to as the 'Sealed VerificationRecord Address' 276.

Next the certification authority creates a new smart contract, referred to as the 'Certification Contract' 272 by providing the Sealed UserRecord Address 264, Certification Token and Sealed VerificationRecord Address 276 as the input data 278 to the contract. When the transaction to create the Certification Contract 272 is mined, the certification authority gets an address of the contract, which is referred to as the 'CertificationRecord Address' 280, and shares this address with the user. This completes the user certification process. The certification process establishes the ownership of the blockchain account (and its associated public-private key-pairs) to a real user 250 whose identity is verified by the certification authority 252. The certification token can be used to set a validity or a timeout period for a key-pair. After the timeout of the certification of key-pair, the certification process has to be done again. This certification renewal process adds additional security and prevents against any misuse of keys.

Figure 3:
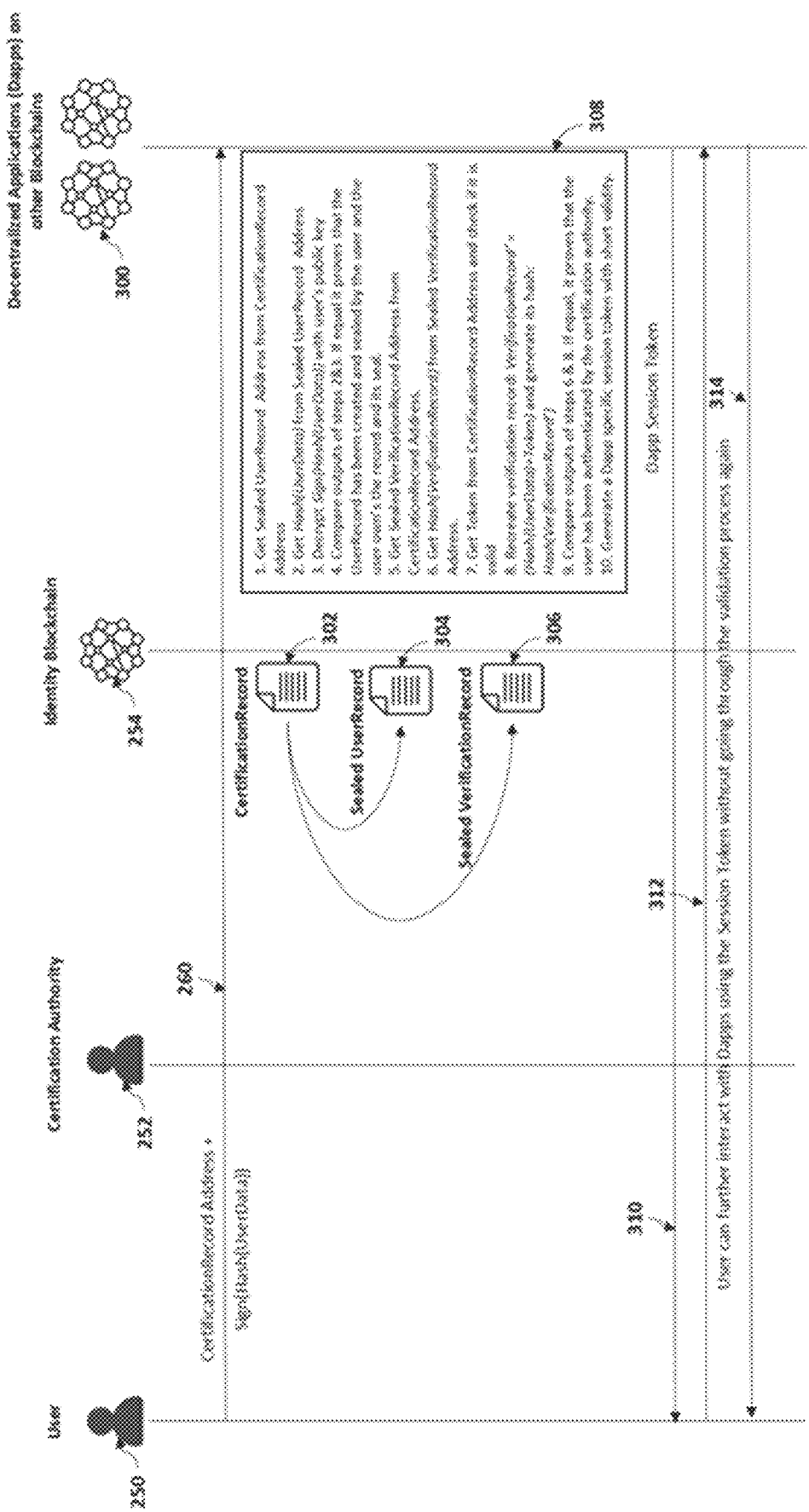
FIG. 3 is an illustration of the user validation process, according to an embodiment of the invention.

Referring to FIG. 3, a method aspect of the present invention for user validation is described in more detail. A certified user 250 can then interact with blockchain applications (either smart contracts or decentralized applications). These blockchain applications may be deployed on different blockchain networks 300. When a blockchain application requests the identity of a certified user 250, the user sends the CertificationRecord Address and the signed and hashed UserData 260 to the blockchain application. The blockchain application then carries out the validation process 308. The steps involved in the validation process 308 may include, as follows:

1. Get Sealed UserRecord Address 304 from Certification Record Address 302;
2. Get Hash(UserData) from Sealed UserRecord Address 304;
3. Decrypt Sign(Hash(UserData)) with user's public key;
4. Compare outputs of steps 2 and 3. If equal it proves that the UserRecord has been created and sealed by the user and the user own's the record and its seal;
5. Get Sealed VerificationRecord Address 306 from CertificationRecord Address;
6. Get Hash(VerificationRecord) from Sealed VerificationRecord Address 306;
7. Get Token from CertificationRecord Address and check if it is valid;
8. Recreate verification record: VerificationRecord'= (Hash(UserData)+Token) and generate its hash: Hash(VerificationRecord');
9. Compare outputs of steps 6 and 8. If equal, it proves that the user has been authenticated by the certification authority.

The above steps complete the user validation process 308. Once a user has been validated, the blockchain application may generate an application specific session token 310 (with a short validity), so that the user can interact 312, 314 further with the application without going through the validation process again for each transaction. A reference implementation of Seal 350 and Certification 352 smart contracts, according to an embodiment of the invention, is shown in FIG. 4.

An embodiment of the invention provides a system and associated methods for key generation and management, where a user can generate a large number of keys in a deterministic manner for use on a single blockchain network or across multiple blockchain networks.

Referring now to FIG. 5, a hardened derivation of a child key in a Hierarchical Deterministic (HD) wallet as proposed in the Bitcoin Improvement Proposal (BIP0032) is described in more detail. An HD wallet contains a hierarchy of keys which are derived in a tree structure. The master key in an HD wallet is derived from a single root seed. HD wallets use child key derivation (CKD) functions to derive children keys from parent keys. The child private key 212 and child public key 214 are derived from the parent keys, and a chain code 202 which adds extra bits of entropy. The inputs to a CKD function 206 are a public or private key 200, a chain code 202 and an index 204. The public or private key 200 and chain code are combined to create an extended key (public or private). With a private extended key it is possible to derive the entire branch of keys in the sub-tree structure rooted at the private extended key. Whereas, with a public extended key only the public keys in the entire branch can be derived. While the ability to derive the entire branch of public keys is very useful, however, it comes at a potential risk of leaking the entire tree structure. This risk is due to the fact that the extended public key also contains the chain code. If the extended public key and a child private key descending from it are revealed, an attacker can use them to generate the parent extended private key. With this parent extended private key all the child private and public keys may be created. To counter this risk, a method of generation of 'hardened' keys is provided in HD wallet where a parent private key 200 is used to derive the child chain code 216 instead of the parent public key. A limitation of the 'hardened' child key derivation mechanism in BIP0032 is that it does not give any protection in the case of a leak of a private extended key. If a private extended key is leaked the entire sub-tree of keys can be derived.

Figure 6:
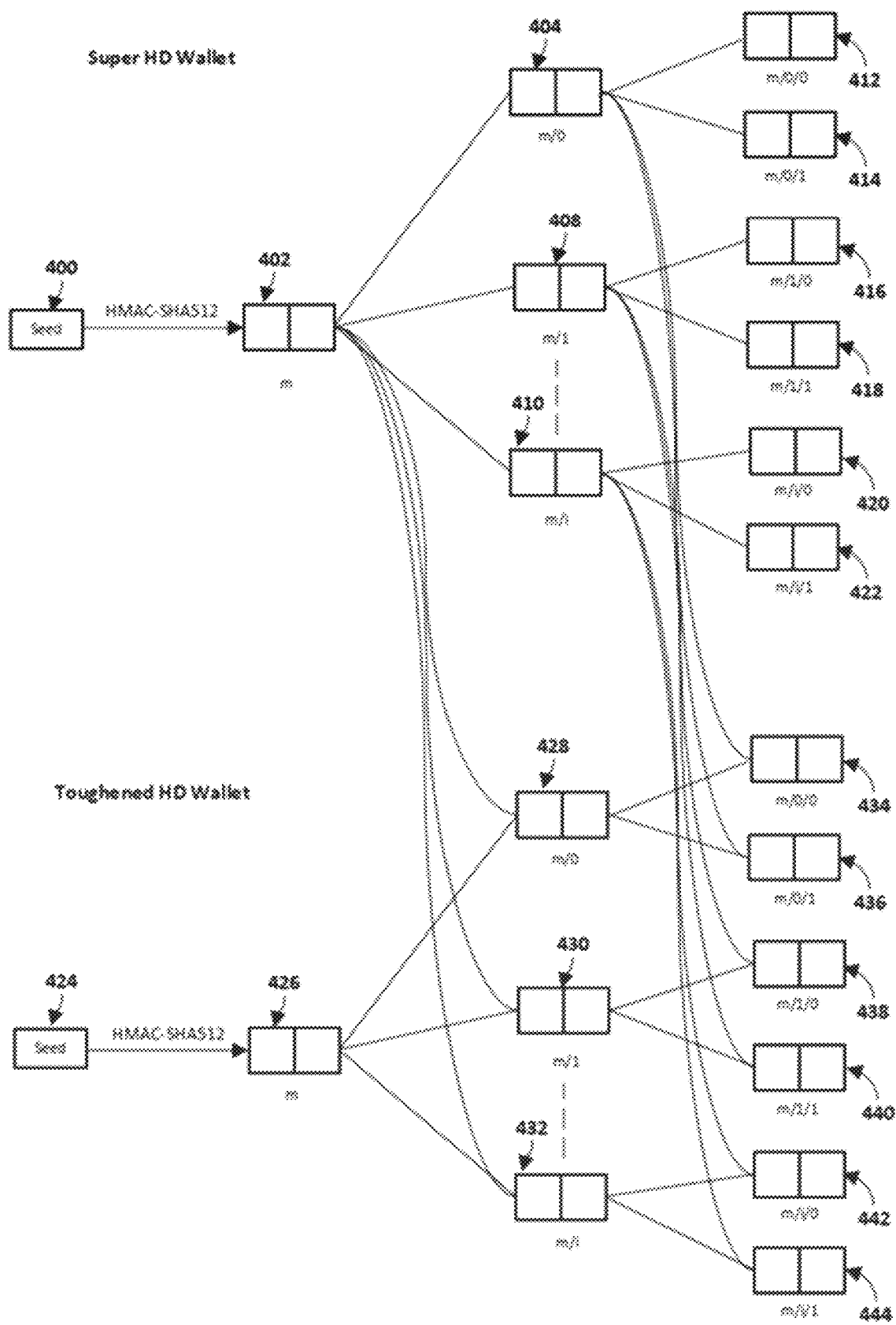
FIG. 6 is an illustration of a toughened HD wallet (an improvement over the Hierarchical Deterministic wallet as proposed in BIP0032), according to an embodiment of the invention.

Referring to FIG. 6, a method aspect of the present invention for key generation is described in more detail. We present an extension to HierarchicalDeterministic (HD) wallets, which adds additional levels of security to counter leak of private extended keys. For each user a 'Super HD Wallet' is created using the HD wallet mechanism described above. More specifically, a primary seed 400 that may comprise a parent public or private key, a parent chain code, and an index, may be received and an enhanced hierarchical deterministic wallet comprising an enhanced parent public key and an enhanced parent private key pair 402 may be generated by applying a CKD function to the primary seed 400. Additionally, the enhanced hierarchical deterministic wallet may further comprise one or more enhanced primary child public/private key pairs 404, 408, 410, where the enhanced primary child public keys is derived from the enhanced parent public key and the enhanced primary child private key is derived from the enhanced parent private key. Moreover, the enhanced hierarchical deterministic wallet may further comprise one or more enhanced secondary child public/private key pairs 412, 414, 416, 418, 420, 422 derived enhanced primary child public/private key pairs 404, 408, 410.

Next, for each blockchain network, separate Toughened HD Wallets' are created. The child keys in a 'Toughened HD Wallet' depend not just on their parent but also on the corresponding parent in the 'Super HD Wallet' (the key at the same path in the Super HD wallet as the parent key). More specifically, a first secondary seed 424, similar to the primary seed 400, may be received and a first toughened hierarchical deterministic wallet may be generated by deriving a first toughened parent public/private key pair 426 from the first secondary seed 424 and a first toughened primary child public/private key pair 428 from the first toughened parent public/private key pair 426. A second toughened primary child public/private key pair 430 may also be derived from the first toughened parent public/private key pair 426. Indeed, any number of toughened primary child public/private key pairs 432 may be derived. Additionally, first and second toughened secondary child public/private key pairs 434, 436 may be derived from the first toughened primary child public/private key pair 428, first and second toughened secondary child public/private key pairs 438, 440 may be derived from the second toughened primary child public/private key pair 430, and any number of toughened secondary child public/private key pairs 442, 444 may be derived from toughened primary child public/private key pairs 432.

While a single toughened hierarchical deterministic wallet is depicted, second, third, and any number of toughened hierarchical deterministic wallets, generated by respective secondary seeds and comprising toughened parent public/private key pairs and any number of primary, secondary, tertiary, and any hierarchically subsequent toughened child public/private key pairs, is contemplated and included within the scope of the invention.

The super or enhanced HD wallet keys can be derived using the same or similar approaches as in BIP32 for this. This "super" or "enhanced" HD wallet is differentiated from the other "toughened" wallets used for each blockchain network further because the "super" or "enhanced" wallet is generated for each user (e.g., are linked to the user identity) whereas "toughened" wallets are generated separately for each blockchain network account that the user's account participates in.

Figures 7, 8:
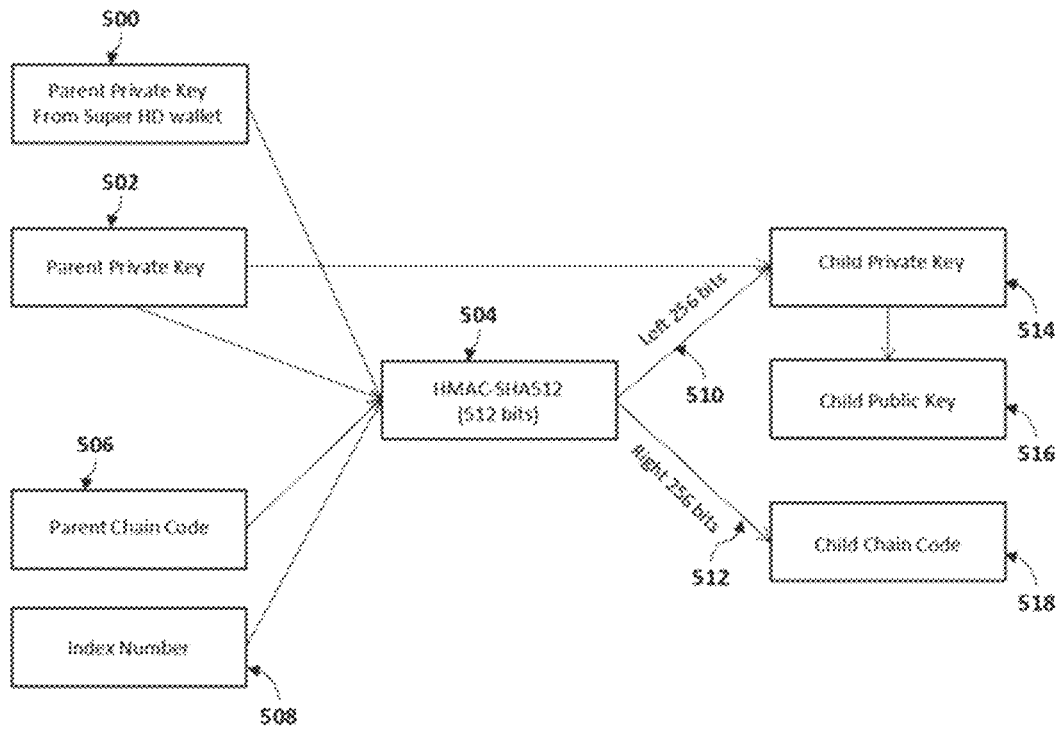
FIG. 7 is an illustration of the toughened and hardened derivation of a child key, according to an embodiment of the invention.
FIG. 8 is an illustration of the examples of toughened and hardened child key derivations, according to an embodiment of the invention.

Referring to FIG. 7, a method aspect of the present invention for the toughened and hardened key derivation will now be discussed in detail. In a normal HD Wallet the Child Key Derivation functions for private and public keys are as follows:

CKDpriv((kpar, cpar), i)→(ki, ci)
CKDpub((Kpar, cpar), i)→(Ki, ci)

where, child private key (ki) and child public key (Ki) depend on their parents keys and the parent chain code.

In a 'Toughened HD Wallet' enhanced child key derivation functions are proposed as follows:

CKDprivTough((kpar, cpar), kparsuper, i)→(ki, ci)
CKDpubTough((Kpar, cpar), Kparsuper, i)→(Ki, ci)

where, child private key (ki) 514 and child public key (Ki) 516 depend on their parents key 502, parent chain code 506 and the corresponding key from the Super HD Wallet 502 (i.e., key at the same path as their parent), as modified by a CKD function 504. Additionally, an index number 508 may also be included in as an input to the CKD function 504. Moreover, in some embodiments, the CKD function 504 may be operable to generate a number of bits that is greater than the number of bits necessary to generate the child private key 514. For example, in the present embodiment, the CKD function 504 may generate 512 bits, where 256 bits are required for the child private key 514. Accordingly, a subset of the 512 bits generated by the CKD function 504, e.g., the "left" 256 bits 510, as is known in the art, may be used to generate the child private key 514. Additionally, the "right" 256 bits 512, as is known in the art, but in any case the bits not used to generate the child private key 514, may be utilized as a child chain code 518 for the derivation/generation of toughened child public/private key pairs. FIG. 8 shows examples of using reference implementations of toughened and hardened child key derivation functions.

Figure 9:
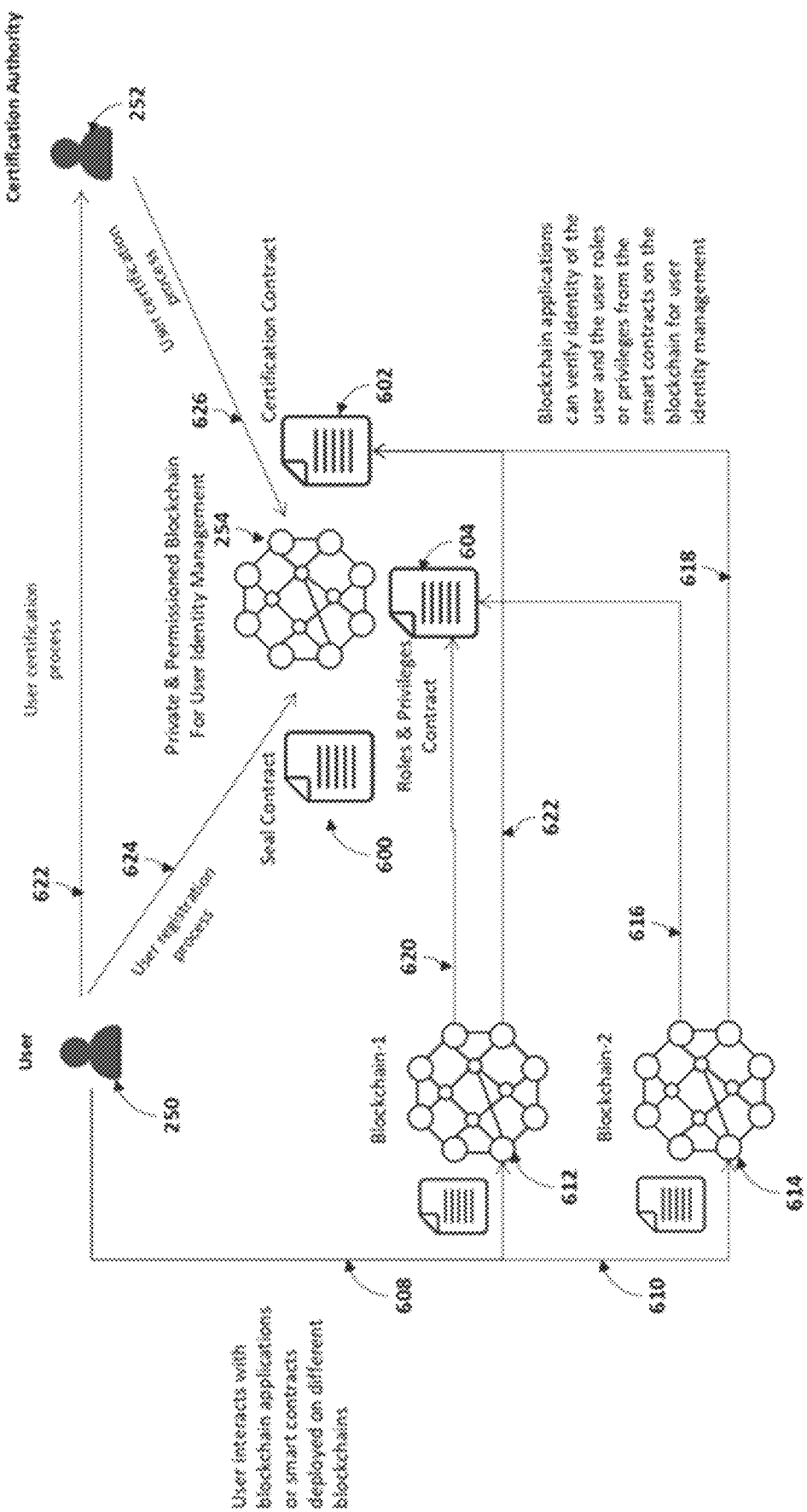
FIG. 9 is an illustration of the user interactions with multiple blockchain networks, according to an embodiment of the invention.
Figure 10:
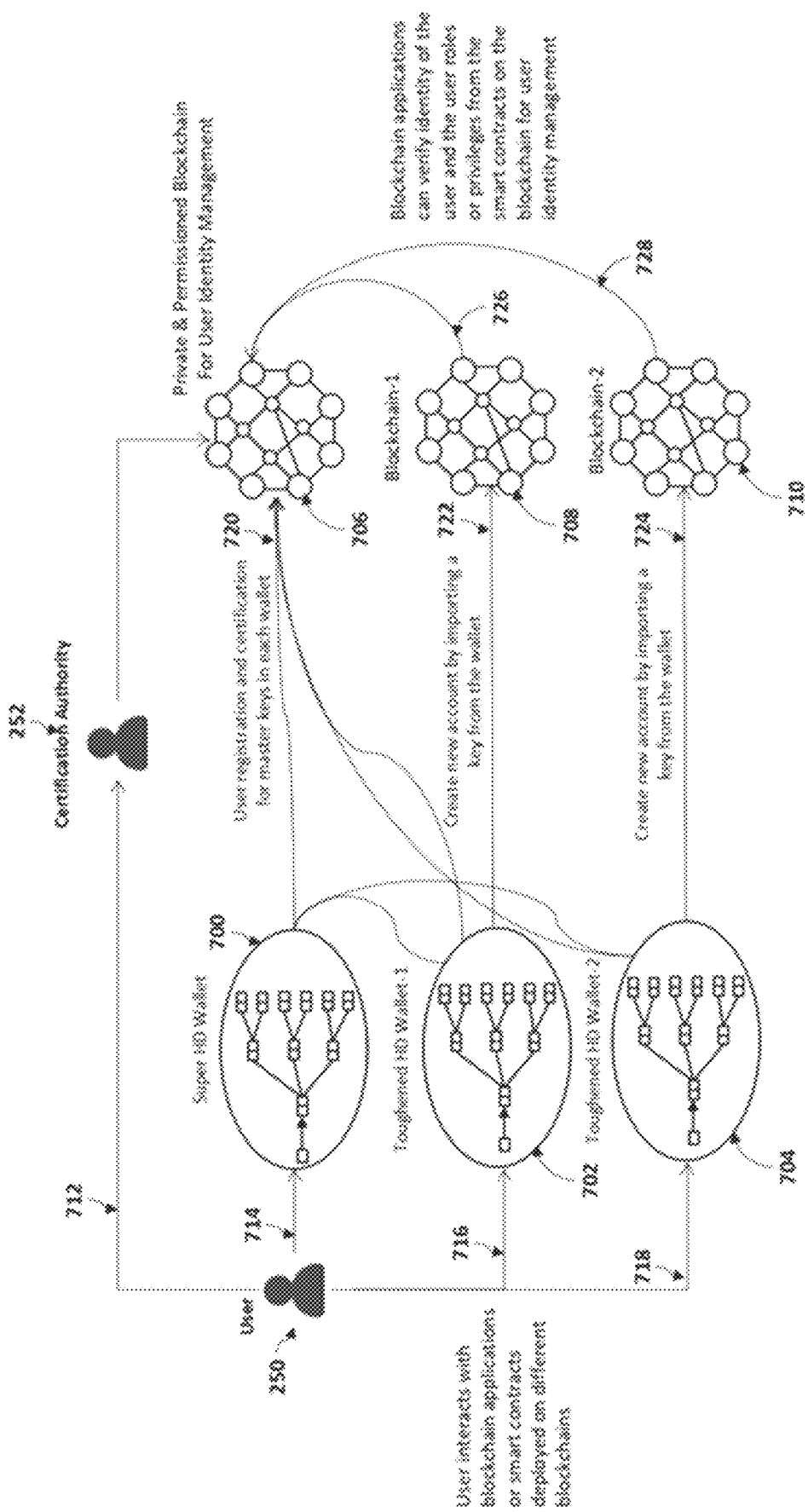
FIG. 10 is an illustration of the scenarios for using wallet keys with different blockchain networks, according to an embodiment of the invention.

An embodiment of the invention provides a system and associated methods for maintaining user identity across multiple blockchain networks. Referring to FIGS. 9 and 10, a method aspect of the present invention for maintaining user identity across multiple chains is described in more detail. For each user a 'Super HD Wallet' 700 is created 714 and separate Toughened HD Wallets' 702, 704 are created 716, 718 for separate blockchain networks 612/708, 614/710. The user registration process 624 needs to be done only once for a user, generating a seal contract 600 as described hereinabove. The certification process 626/720 can be carried out once for the Super HD wallet and then for each Toughened HD wallet, generating a certification contract 602 as described hereinabove. Once a master key in a HD wallet (Super or Toughened) has been certified for a user, the ownership of a child key can verified by sharing the derivation path from master to child key without the need to through the whole certification and validation process again when the master key is already certified. To use a child key from a Toughened HD wallet on a blockchain network, the user creates a new blockchain account by importing 722, 724 the key 608, 610 from the Toughened HD Wallets 702, 704. The identity of the user may be verified 726, 728 by the blockchain networks 612/708, 614/710 accessing 622, 618 the certification contract 602.

The derived child keys in a 'Toughened HD wallet' can be used in several ways, described as follows:
1) In one embodiment, the child public keys can be used for receiving funds and the private keys are required for spending funds.
2) In another embodiment, new child keys can be derived and used for each session or each transaction.
3) In another embodiment, specific roles and privileges can be assigned to specific child keys or specific sub-trees in a Toughened HD wallet. A smart contract 604 on the user identity blockchain can maintain a mapping from the child keys to specific roles and privileges. The smart contract 604 may function to ensure requests 620, 616 made by the respective blockchain networks 612, 614 comply with the specific roles and privileges made for those blockchain networks.
4) In another embodiment, a smart contract can be used to maintain a mapping from the child keys to their respective timeout periods.
5) In another embodiment, a smart contract can be used to control key reuse, where a key can be allowed to be used for a limited number of transactions only.
6) In another embodiment, smart contracts can be used for information sharing on the user accounts across different blockchain networks.

The proposed methods of maintaining user identity across multiple blockchain networks, can prevent a rogue user from accessing blockchain applications by impersonating a real user. While a rogue can try to generate one or more HD wallets (with normal or hardened keys) and attempt to access blockchain applications on different chains, however, since these applications require the user's master keys to be certified, they will reject access to the user when the validation process is performed as there will be no linked Super HD wallet for which a certification exists on the identity blockchain.

Figure 11:
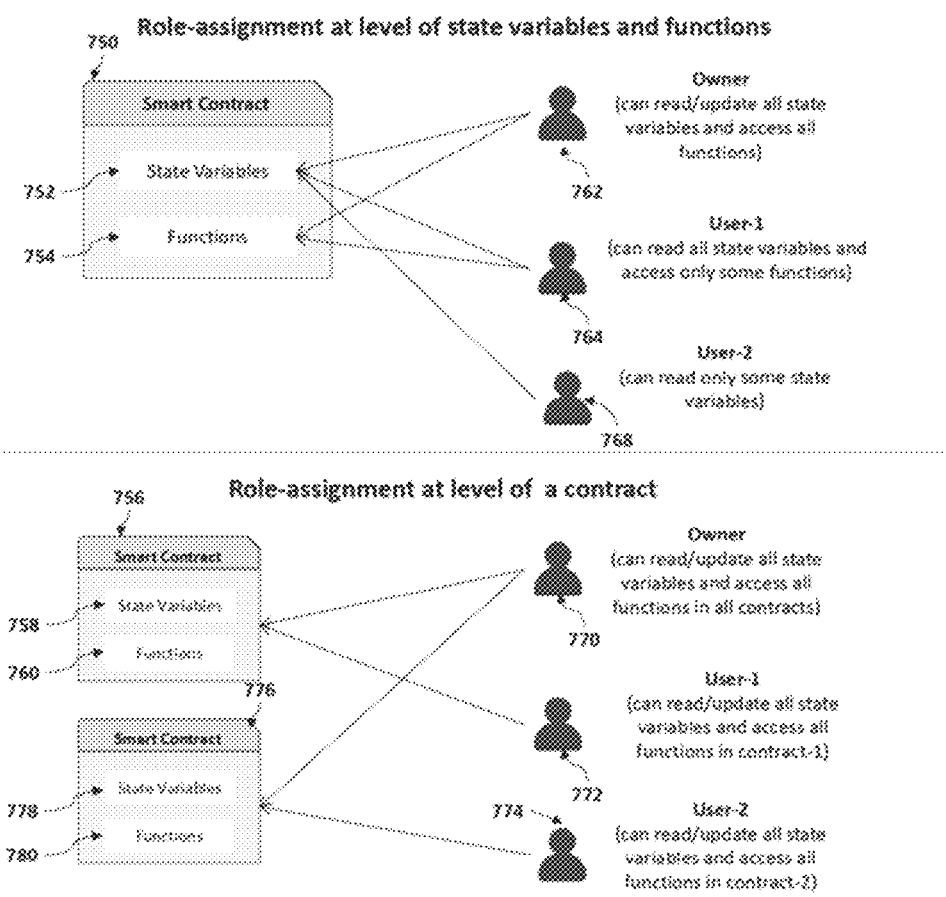
FIG. 11 is an illustration of the examples of roles-based access control with different roles assigned to different users, according to an embodiment of the invention.

An embodiment of the invention provides a system and associated methods for role-based access control in blockchain applications. Referring to FIGS. 11 and 12, a method aspect of the present invention for role-based access control is described in more detail. Role-based access control for blockchain applications is used to restrict access to authorized users. The role-based access control system allows defining roles and policies which control access to the blockchain applications and their associated smart contracts. A role is a set of permissions which grant access to particular resource of a blockchain application (for example, a state variable or a function in the smart contract, or a collection of smart contracts). Policies are attached to roles which define the permissions for the roles. The information about roles and policies for a blockchain application may be maintained in a smart contract on the identity blockchain. Role assignments maybe done in the following ways:

1) In one embodiment, as shown in FIG. 11, where a blockchain application has a single smart contract 750 (that includes a set of state variables 752 and functions 754), the role assignments may be done to specific state variables 752 and functions 754. For example, a user in the role of a contract owner 762 would have access to read and update all state variables 752 and access all the functions 754 of the smart contract 750. Whereas, other users 764, 768 may have access to only a subset of the state variables and functions.
2) In another embodiment, as shown in FIG. 11, where a blockchain application has multiple smart contracts 756, 776 the role assignments may be done at the level of smart contracts. For example, a user in the role of the application owner 770 would have access to read and update all state variables 758,778 and access all the functions 760, 780 in all the smart contracts 756, 776 in the application. Whereas, other users 772, 774 may have access to only certain smart contracts in the application.
3) In another embodiment, as shown in FIG. 12, different roles may be assigned to different child keys belonging a certified user 800. For example, a derived key at path m/0/1 in the user's toughened HD wallet 802 may be allowed to access all the state variables 806 and functions 810 in a smart contract 804 and, alternatively, all state variables 814, 814' and functions 816, 816' in smart contracts 812, 812', whereas a derived key at path m/0/0/1 in the user's toughened HD wallet 802 may be allowed to access only a subset of state variables and functions, e.g. either state variables 814 and functions 816 of smart contract 812 or state variables 814' and functions 816' of smart contract 812'.
4) In another embodiment, additional constraints (at the contract or application-level) may be defined within the policies attached to roles. For example, in a case of a voting application on the blockchain, a user may be allowed to vote only once (i.e., send a transaction to the vote function of the smart contract only once).

Figure 13:
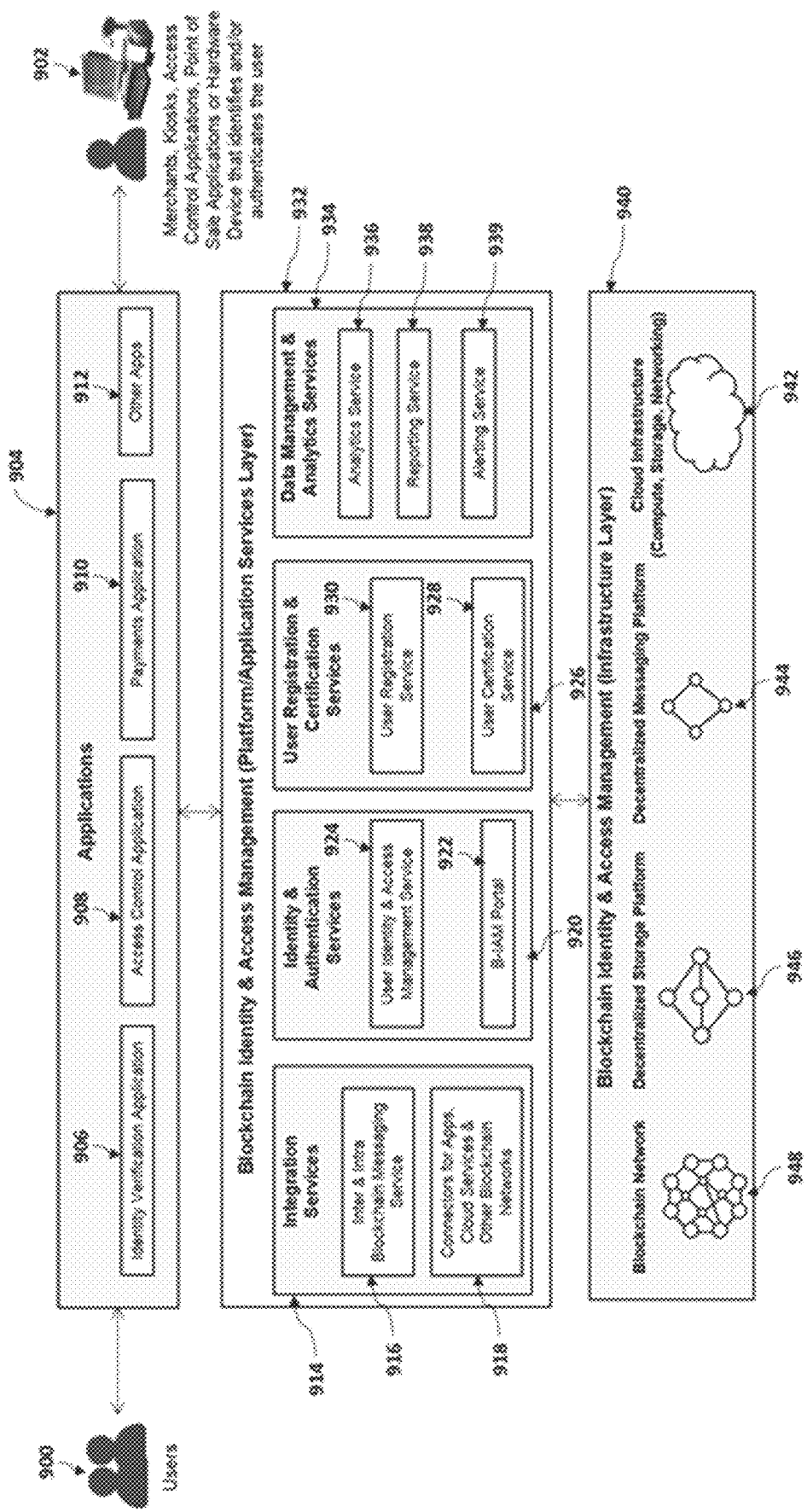
FIG. 13 is a schematic diagram of a blockchain identity and access management system (B-IAM), according to an embodiment of the present invention.

Referring to FIG. 13, a blockchain identity and access management system (B-IAM) system according to an embodiment of the present invention is now described in detail. The B-IAM system's infrastructure layer 940 comprises a blockchain network 948, a decentralized storage platform 946, decentralized messaging platform 944 and cloud infrastructure 942. All the smart contracts related to user identity management (such as the Seal Contract, Certification Contract, Roles & Privileges Contract) deployed on the blockchain network 948. For 948, a blockchain platform such as Ethereum can be used. The decentralized messaging platform 944 is used for messaging between the decentralized applications (Dapps), which are built on the B-IAM system. For 944, a decentralized messaging platform such as Whisper, can be used. Whisper messages are transient in nature and have a time-to-live (TTL) set. Each message has one or more topics associated with it. The Dapps running on a blockchain node inform the node about the topics to which they want to subscribe. Whisper uses topic-based routing where the nodes advertise their topics of interest to their peers. Topics are used for filtering the messages which are delivered to a node which are then distributed to the Dapps running on the blockchain node. The decentralized storage platform 944 is used for storing user data such as user photos, and scanned identity documents. For 946, a decentralized storage platform such as Swarm can be used. Swarm is a decentralized storage platform and content distribution service for the Ethereum blockchain platform. Swarm is a peer-to-peer storage platform which is maintained by the peers who contribute their storage and bandwidth resources. Swarm has been designed to dynamically scale up to serve popular content and has a mechanism to ensure the availability of the content which is not popular or frequently requested. The cloud infrastructure 942, is used for collection, storage and analysis of application usage data.

The B-IAM system's platform and application services layer 932 comprises Integration Services 914, Identity & Authentication Services 920, User Registration & Certification Services 926, Data Management & Analytics Services 934. The Integration Services 914, comprise Inter-Blockchain and Intra-blockchain Messaging Services 916, and various connectors for applications, cloud services and other blockchain networks 918. The Identity & Authentication Services 920 comprise a User Identity & Access Management Service 924, and a B-IAM portal 922. The B-IAM portal 922 allows users 900 to access and monitor their identity data recorded in the B-IAM system and view identity requests made by different applications. The User Registration & Certification Services 926 comprise a User Registration Service 930 (which is used for the process flow as shown in FIG. 2) and a User Certification Service 928 (which is used for the process flow as shown in FIG. 3). The Data Management & Analytics Services 934, are deployed on the cloud infrastructure 942. These include an analytics service 936, reporting service 938, and an alerting service 939. The analytics service 936, can analyze multi-blockchain behavior of a user account to ensure compliance. It is contemplated and included within the scope of the invention that all of these platforms and applications services are operable on a computerized device comprising a processor, a network communication device, and a data storage device as described hereinabove.

The B-IAM system can be used for providing identity, access management and authentication services for a wide range of applications 904. Some exemplary applications that can benefit from the B-IAM system include an identity verification application 906, access control application 908 and a blockchain-based payments application 910. All of these may communicate with third party devices and applications 902 that identifies and/or authenticates the users 900.

Figure 14:
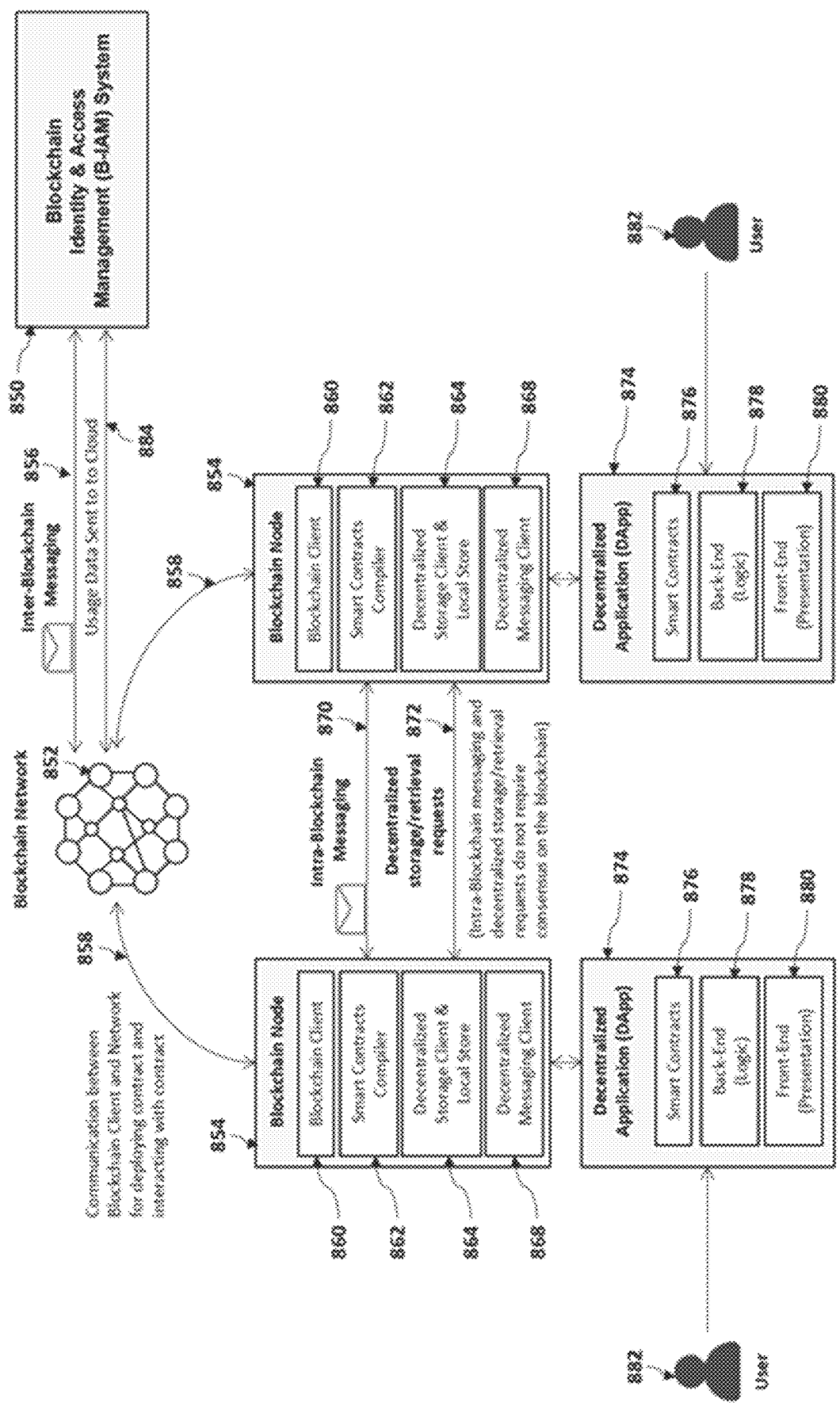
FIG. 14 is an illustration of the interactions between the B-IAM system and other blockchain networks and decentralized applications, according to an embodiment of the present invention.

Referring to FIG. 14 the interactions between the B-IAM system 850 and other blockchain networks 852 and decentralized applications 874, according to an embodiment of the present invention are now described in detail. The B-IAM system can be used to provide user identity and access management services for various decentralized applications deployed on different blockchain networks. The B-IAM allows a user to work on multiple blockchain networks, or multiple applications deployed on the same blockchain networks, while maintaining the same identity. The blockchain network 852 can communicate 858 with the B-IAM system using an Inter-Blockchain Messaging protocol 856. The blockchain network 852 can also send usage data 884 (such as application usage and user interactions data) to the B-IAM system. Applications deployed on a blockchain network 852 are either in the form of smart contracts 876 or Dapps 874. A smart contract is a piece of code which is deployed on the blockchain network and is uniquely identified by an address. While smart contracts can directly be used by end users 882 who can send transactions or calls to the smart contracts through blockchain clients, however, to provide a more user-friendly interface to smart contracts, Dapps can be developed and applied over these smart contracts. A Dapp 874 includes one or more associated smart contracts 876, a front-end user interface 880 (which is typically implemented in HTML and CSS) and a back-end 878 (which is typically implemented in JavaScript). Users can submit transactions to the smart contract 876 associated with a Dapp from the Dapp's web interface itself. The Dapp's web interface forwards the transactions to the blockchain platform 852 and displays the transaction receipts or state information in the smart contracts in the web interface. A Dapp is deployed on a blockchain node 854 which serves the Dapp's web-based user interface. The Dapp logic is controlled by the associated smart contracts 876 which are deployed on the blockchain platform 852. Dapps which have special storage requirements can make use of a decentralized storage platform (such as Swarm). Similarly, Dapps which have special messaging requirements can leverage a decentralized messaging platform (such as Whisper). A blockchain node 854 typically comprises a blockchain client 860 that sends transactions to the blockchain network 852, a smart contracts compiler 862, a decentralized storage client & local store 864, and a decentralized messaging client 868. While the smart contracts are deployed on the blockchain network, Intra-blockchain messaging 870 (over a decentralized messaging platform) and decentralized storage/retrieval requests 872 (over a decentralized storage platform) work off the chain as they do not require a consensus on the blockchain.

Figure 15:
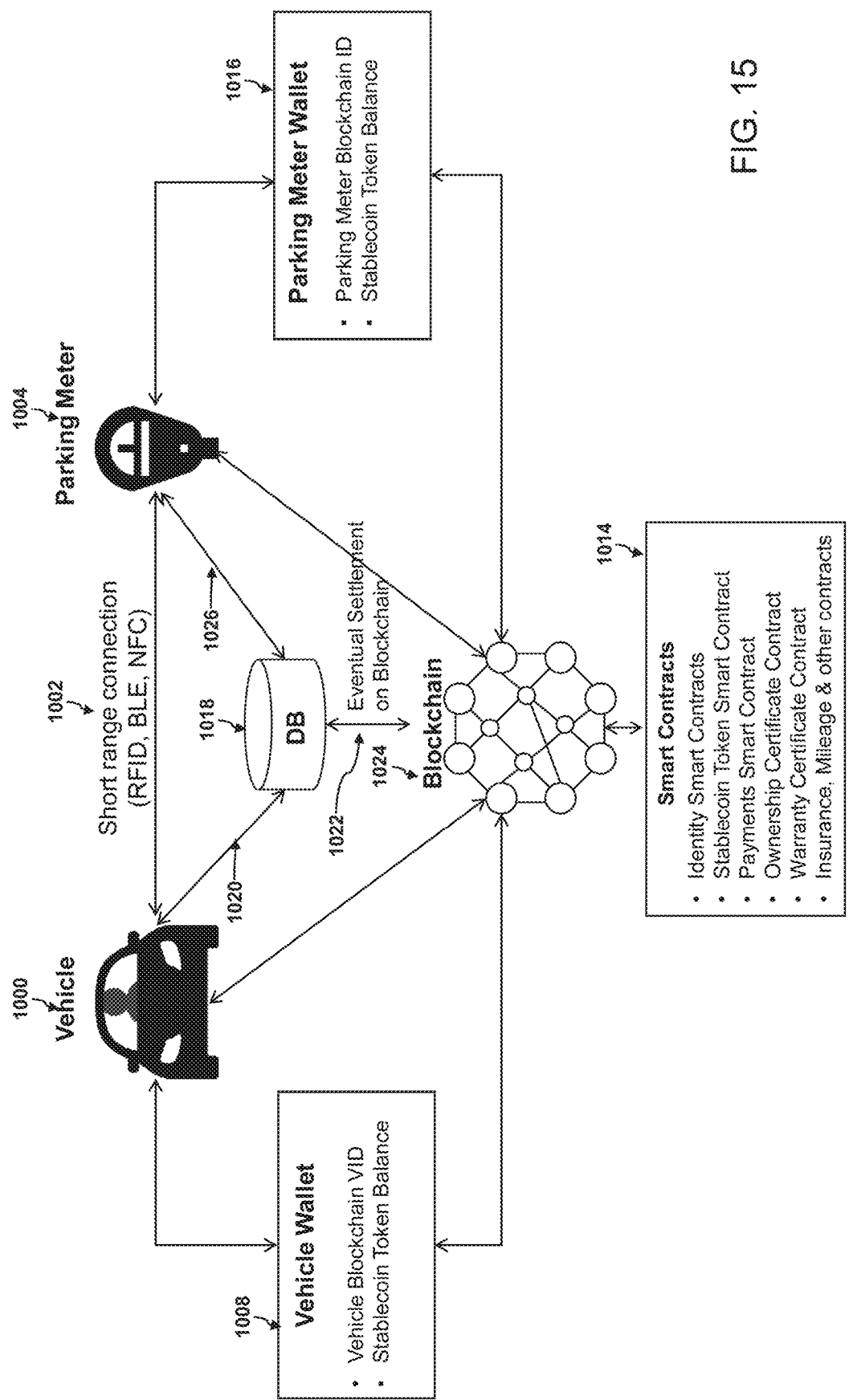
FIG. 15 is an illustration of the CarCoins system architecture, according to an embodiment of the invention.

Referring to FIG. 15, an illustration of the CarCoins system architecture, according to an embodiment of the invention is now described in detail. CarCoins is a blockchain-based vehicle identifiers & wallets system for car-based payments. CarCoins is a blockchain based system that allows cars to exchange tokens or coins with external entities such as other cars, parking meters, toll gates, IoT devices, for instance in an autonomous and decentralized manner without involving any centralized financial institution or a payment gateway. The cars are assigned unique identifiers or decentralized identities (DIDs) using a B-IAM system described in FIG. 13. The CarCoins system is a specific realization of the B-IAM system for a specific use case where identities are assigned to cars, to enable them to autonomously transact with external entities such as other cars, parking meters, toll gates, IoT devices, for instance. Embodiments of the CarCoins system can have one or more of the following features:

1. Is end-to-end
2. Has short range connection
3. Has off-chain model
4. Eventual sync with cloud blockchain and off-chain payment synchronization
5. Periodic sync and disconnected connection to cloud during payment
6. Uses and/or supports VID and DID format
7. Use blockchain and decentralization with smart contracts
8. Local wallet on car, linked to Android applications on car and smartphone
9. Hierarchical ID with different privileges The car/vehicle 1000 exchanges data, messages and tokens with a parking meter 1004 over a short-range connection (based on RFID, BLE or NFC communication protocols) 1002. The vehicle 1000 has a vehicle wallet 1008 which is uniquely identified by a first unique identifier, such as a Vehicle ID (VID) and has a token balance associated with it. The token balance within the vehicle wallet 1008 can be in the form of a blockchain-based virtual currency (referred to as CarCoins). The CarCoins can be pegged to stable fiat currencies in specific embodiments. The parking meter 1004 has a meter wallet 1016 which is uniquely identified by another unique identifier, such as a parking ID (PID) and has a token balance associated with it. The data related to messages and tokens exchanged 1002 between the vehicle 1000 and parking meter 1004 is stored 1020, 1026 within a database 1018 which is eventually synchronized 1022 to a blockchain network 1024. On the blockchain network 1024, smart contracts 1014, such as Identity Smart Contracts, Stablecoin Token Smart Contract, Payments Smart Contract, Ownership Certificate Contract, Warranty Certificate Contract, Insurance, Mileage & other contracts, are deployed.

While a parking meter 1004 is mentioned, it is contemplated and included within the scope of the invention that the device with which the vehicle 1000 interacts may be comprised by any fixed structure, such as, but not limited to, toll collection structures, drive-through payment structures, restaurant payment structures, other parking locations and structures, and the like.

Figure 16:
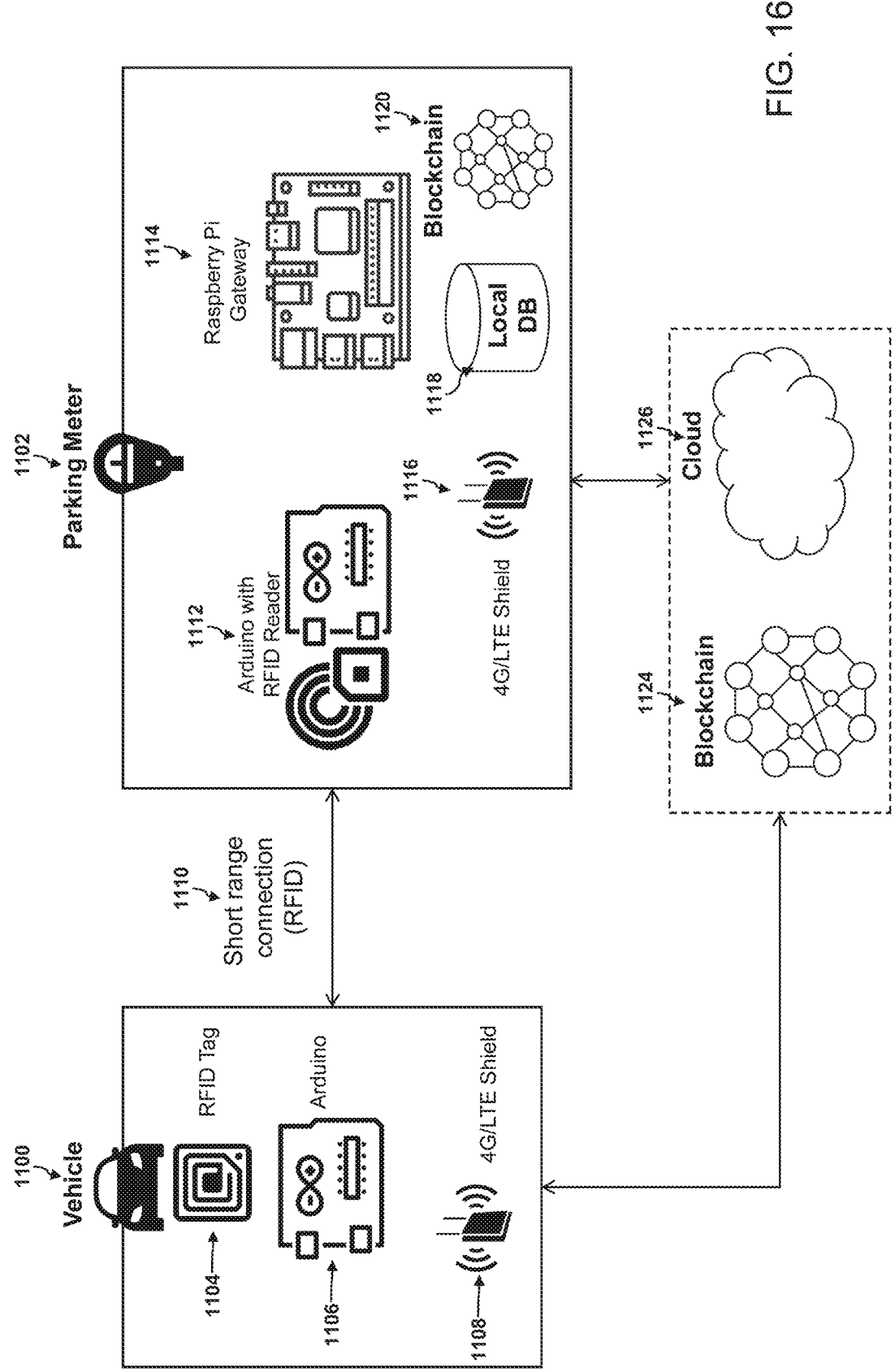
FIG. 16 is an illustration of a reference implementation architecture of CarCoins system where a vehicle presents tag and the blockchain node is on the parking meter, according to an embodiment of the invention.

Referring to FIG. 16, an illustration of a reference implementation architecture of CarCoins system where car presents tag and the blockchain node is on the parking meter, according to an embodiment of the invention is now described in detail. The vehicle 1100 and parking meter 1102 communicate over a short-range RFID (radio-frequency identification) connection. An RFID tag 1104 is attached to the vehicle 1100. The vehicle 1100 is equipped with a microcontroller board such as Arduino 1106 and a 4G/LTE connection through a 4G/LTE shield 1108. The parking meter 1102 is equipped with a microcontroller board such as Arduino 1112 and a 4G/LTE connection through a 4G/LTE shield 1116. An RFID reader is attached to the microcontroller board 1112 and is configured to transmit 1110 an interrogator signal which the RFID tag 1104 transmits 1110 a unique identifier back to the RFID reader responsive to the interrogator signal. While RFID is mentioned, all short-range wireless communication modes, standards, and protocols as are known in the art are contemplated and included within the scope of the invention, including, but not limited to, near-field communication (NFC), Bluetooth, Bluetooth Low Energy (BLE), ZigBee, Z-Wave, WiFi Direct, and the like.

A gateway device 1114 based on a single-board computer such as Raspberry Pi is attached to the parking meter. Any other single-board device, system-on-a-chip, or other similar device capable of performing the functions of the gateway device 1114 as described herein is contemplated and included within the scope of the invention. The gateway device 1114 hosts a local database 1118 and a blockchain node 1120. The vehicle 1100 and parking meter 1102 communicate with a blockchain network 1124 and a cloud backend 1126. Although the specific standard of 4G/LTE is recited, it is contemplated and included within the scope of the invention that a wireless standard of any type may be implemented in each of the vehicle 1100 and the parking meter 1102, including, but not limited to, all broadband cellular network standards, such as 5G.

Figure 17:
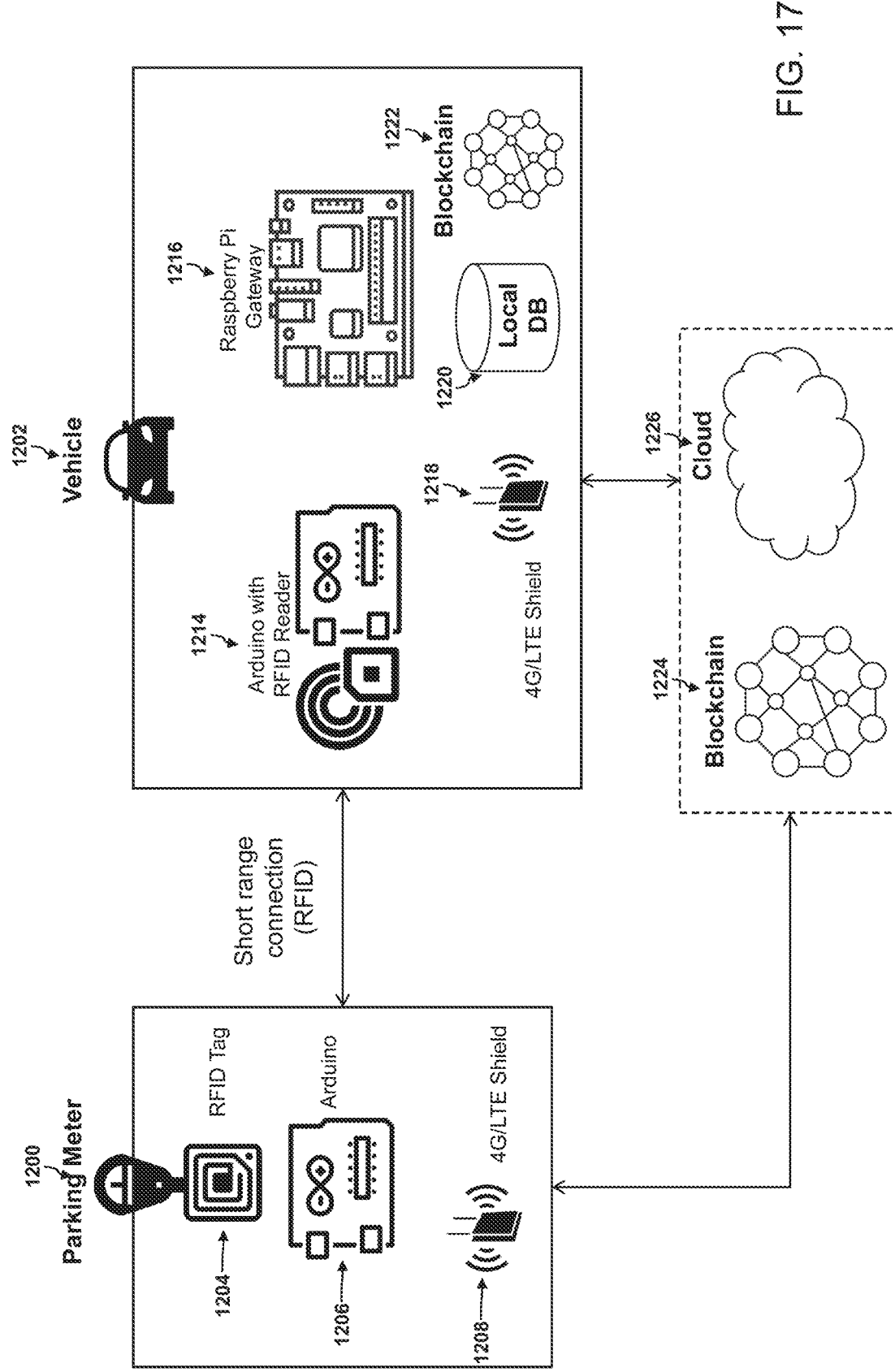
FIG. 17 is an illustration of a reference implementation architecture of CarCoins system where the parking meter presents tag and the reader and blockchain node is on the vehicle, according to an embodiment of the invention.

Referring to FIG. 17, an illustration of a reference implementation architecture of CarCoins system where the parking meter presents tag and the reader and blockchain node is on the car, according to an embodiment of the invention is now described in detail. The vehicle 1202 and parking meter 1200 communicate over a short-range RFID connection. An RFID/NFC tag 1204 is attached to the parking meter 1200. The parking meter 1200 is equipped with a microcontroller board such as Arduino 1206 and a 4G/LTE connection through a 4G/LTE shield 1208. The vehicle 1202 is equipped with a microcontroller board, such as an Arduino 1214, and a 4G/LTE connection through a 4G/LTE shield 1218 or other wireless communication device. An RFID reader is attached to the microcontroller board 1214. A gateway device 1216 based on a single-board computer such as Raspberry Pi is attached to the vehicle 1202. The gateway device 1214 hosts a local database 1220 and a blockchain node 1222. The vehicle 1202 and parking meter 1200 communicate with a blockchain network 1224 and a cloud backend 1226.

The vehicle 1202 detects the meter tag 1204 and sends a unique code to open the parking gate. The unique code can only be generated by a CarCoin Secure Element (SE) on the car—either on the reader on the car or in the Android OS on car. The unique code combines the meter ID with the CarCoin UID and a session ID. The parking meter can recognize if the unique code is correct. It will not allow codes not generated by CarCoin SE. When connected, the transaction is uploaded to the cloud blockchain by the CarCoin SE.

In another embodiment, the car drives into a store and the sales agent generates a unique payment request code and the CarCoin SE responds with a payment completed code. The payment request code may not include the payment value in which case the payment value is entered by user on car. No changes are required to the parking meter except a tag stuck to the roof of the car parking entrance and a way to intercept the gate open signal if needed. In most cases there is no gate.

Figure 18:
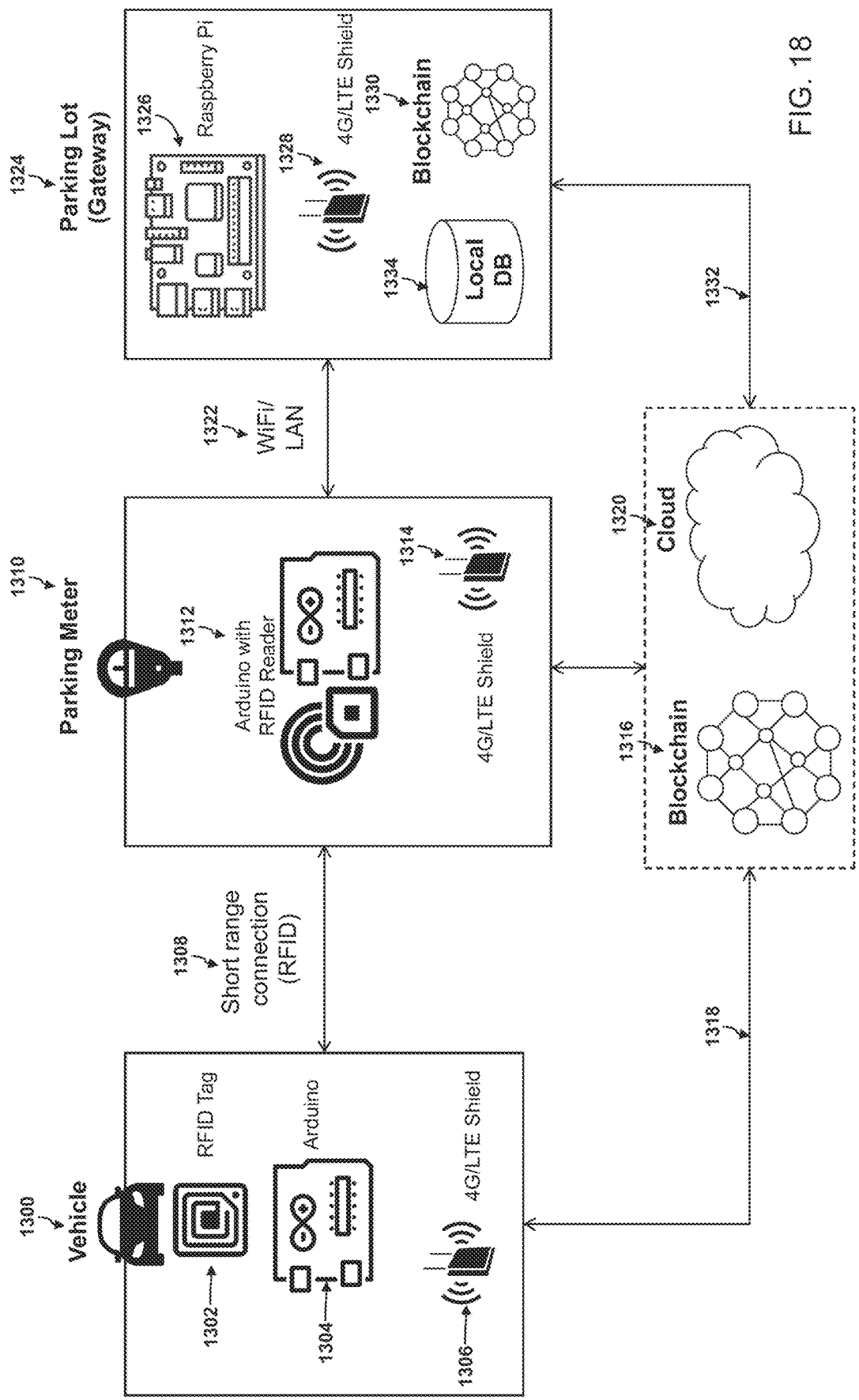
FIG. 18 is an illustration of a reference implementation architecture of CarCoins system in a peer to peer model where car and parking meter exchange coins, according to an embodiment of the invention.

Referring to FIG. 18, an illustration of a reference implementation architecture of CarCoins system in a peer to peer model where car and parking meter exchange coins, according to an embodiment of the invention is now described in detail. The vehicle 1300 and parking meter 1310 communicate over a short-range RFID connection 1308. An RFID tag 1302 is attached to the vehicle 1300. The vehicle 1300 is equipped with a microcontroller board such as Arduino 1304 and a 4G/LTE connection through a 4G/LTE shield 1306. The parking meter 1310 is equipped with a microcontroller board such as Arduino 1312 and a 4G/LTE connection through a 4G/LTE shield 1314. An RFID reader is attached to the microcontroller board 1312. The parking lot 1324 has a gateway device 1326 based on a single-board computer such as Raspberry Pi. Each of the microcontroller board 1212 and the gateway device 1326 may comprise another wireless communication device, such as a Wi-Fi card, and communicate with each other using those wireless communication devices. While Wi-Fi is mentioned, any form of wireless or wired communication devices on a local area network (LAN) of wireless LAN is contemplated and included within the scope of the invention, including Ethernet cards. Furthermore, devices that enable personal area networks (PANs), such as Zigbee and Z-wave, are also contemplated and may be utilized by the microcontroller board 1312 and the gateway device 1326 for such communication. The UID of the vehicle 1300 may be read by the microcontroller board 1312 and transmitted to the gateway device 1326 for generation of the blockchain transaction as described above. Moreover, the gateway device 1326 may synchronize the generated transaction by the 4G/LTE shield 1314, 1328, of either the parking meter 1310 or the parking lot 1324, depending on connectivity conditions. The gateway device 1326 hosts a local database 1334 and a blockchain node 1330. The vehicle 1300, parking meter 1310 and parking lot gateway 1326 communicate with a blockchain network 1316 and a cloud backend 1320.

Figure 19:
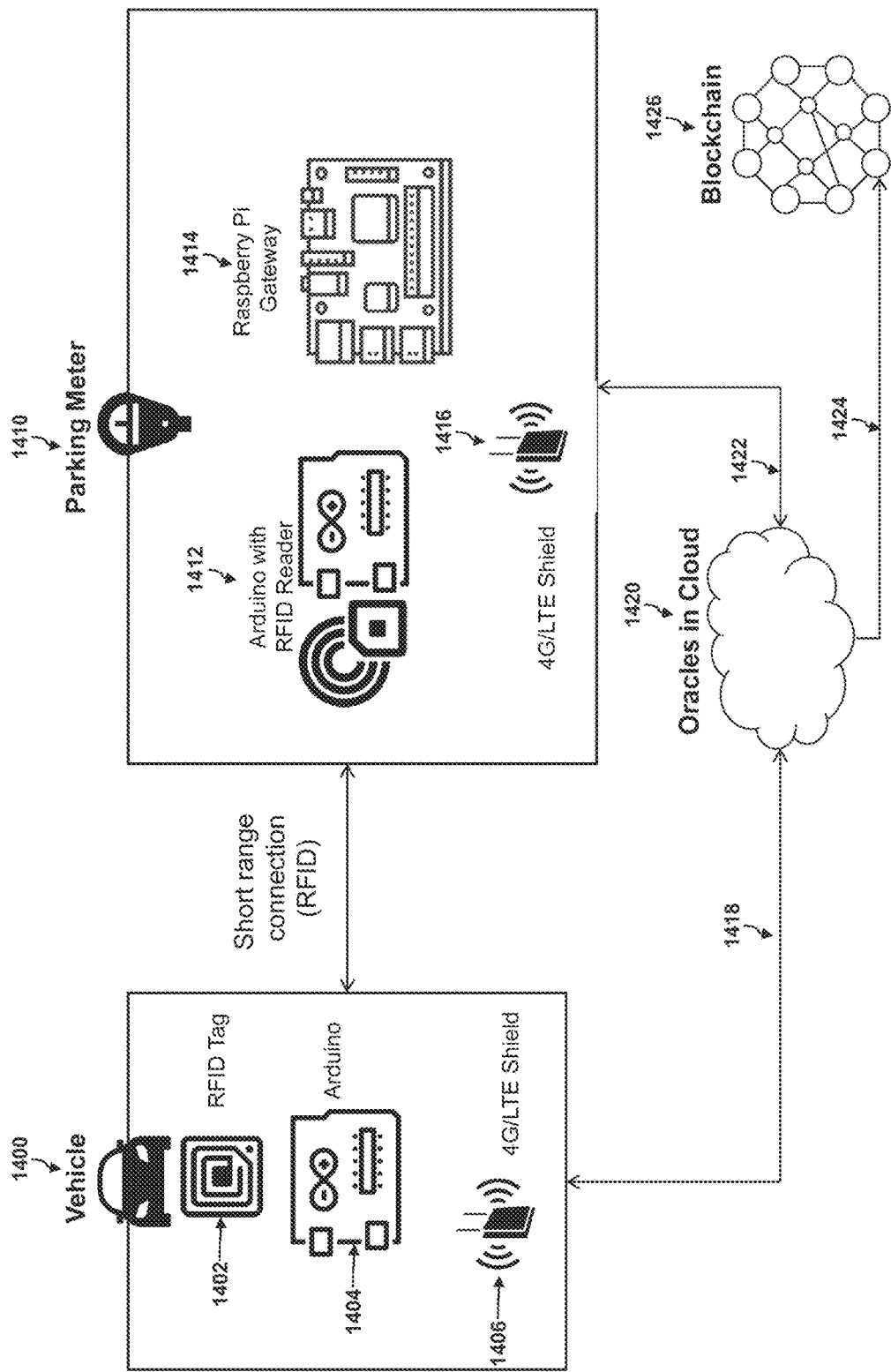
FIG. 19 is an illustration of a reference implementation architecture of CarCoins system where the vehicle and the parking meter use oracles to connect to blockchain, according to an embodiment of the invention.
Figure 20:
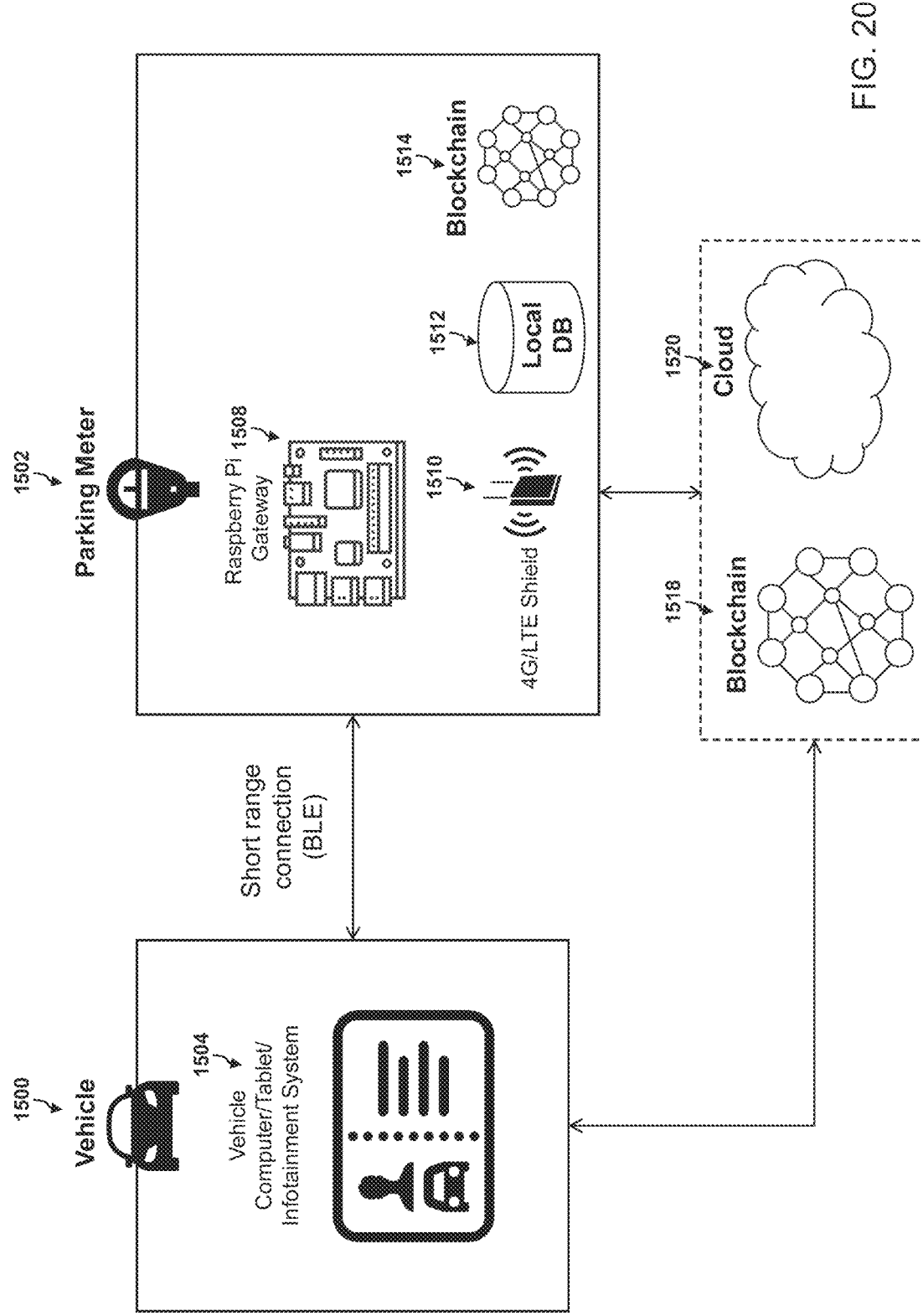
FIG. 20 is an illustration of a reference implementation architecture of CarCoins system where a BLE connection is established between the vehicle's infotainment system and the parking meter, according to an embodiment of the invention.

Referring to FIG. 19, an illustration of a reference implementation architecture of CarCoins system where car and parking meter use oracles to connect to blockchain, according to an embodiment of the invention is now described in detail. The vehicle 1400 and parking meter 1410 communicate over a short-range RFID connection. An RFID tag 1402 is attached to the vehicle 1400. The vehicle 1400 is equipped with a microcontroller board such as Arduino 1404 and a 4G/LTE connection through a 4G/LTE shield 1406. The parking meter 1410 is equipped with a microcontroller board such as Arduino 1412 and a 4G/LTE connection through a 4G/LTE shield 1416. An RFID reader is attached to the microcontroller board 1412. A gateway device 1414 based on a single-board computer such as Raspberry Pi is attached to the parking meter. The vehicle 1400 and parking meter 1402 communicate 1418, 1422 with a blockchain network 1426 using oracles in cloud 1420. An oracle is a service which connects smart contracts on a blockchain network with the outside world. In this case, the vehicle and parking meter can feed information to the smart contracts deployed on the blockchain network 1426 through 1424 the oracles 1420. Vehicle 1400 and parking meter 1410 use oracles 1420 to connect to blockchain 1426. Both vehicle and parking meter trigger their own Oracles with each other IDs along with timestamp, GPS and other information. The cloud server handles the credits and tokens debits to respective accounts via smart contracts when both sides eventually connect to the cloud. This model is useful for credit card like payments without connected cloud Referring to FIG. 20, an illustration of a reference implementation architecture of CarCoins system where a BLE connection is established between the car's infotainment system and the parking meter, according to an embodiment of the invention is now described in detail. The vehicle 1500 and parking meter 1502 communicate over a short-range RFID connection. The vehicle 1500 is equipped with a Vehicle Computer/Tablet/Infotainment System 1504. The parking meter 1502 is equipped with a single-board computer such as Raspberry Pi 1508 and a 4G/LTE connection through a 4G/LTE shield 1510. The parking meter hosts a local database 1512 and a blockchain node 1514. The vehicle 1500 and parking meter 1502 communicate with a blockchain network 1518 and a cloud backend 1520

Figure 21:
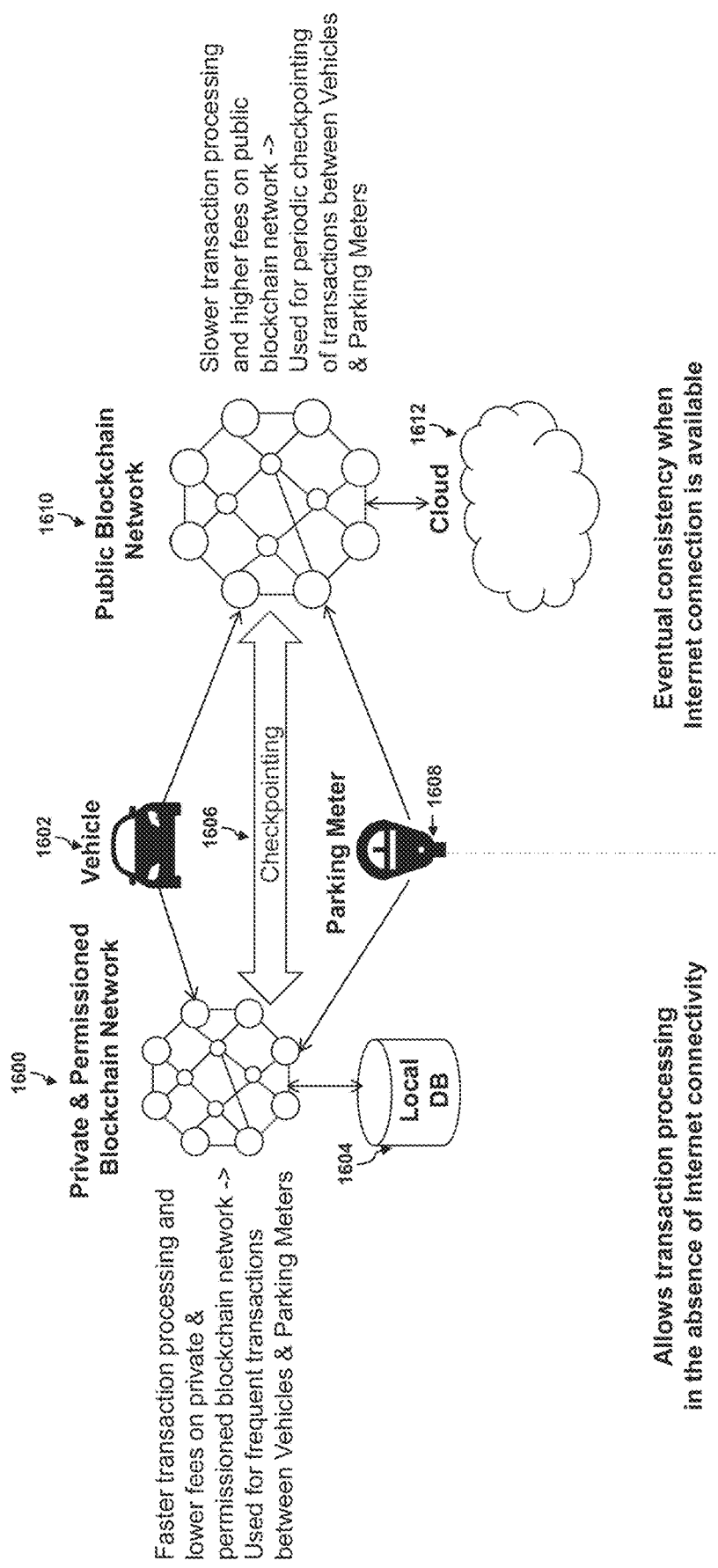
FIG. 21 is an illustration of a synchronization and checkpointing process between a private and public blockchain network used by the CarCoins system, according to an embodiment of the invention.

Referring to FIG. 21, an illustration of a synchronization and checkpointing process between a private and public blockchain network used by the CarCoins system, according to an embodiment of the invention is now described in detail. Vehicle 1602 and parking meter 1608 have accounts on a private and permissioned blockchain network 1600 and a public blockchain network 1610. The private and permissioned blockchain network 1600 is used for frequent transactions between the vehicles and parking meters. The transactions are processed fast and with low fees on the private and permissioned blockchain network 1600. The transactions between the vehicles and parking meters are checkpointed 1606 on the public blockchain network 1610 at regular intervals. During the checkpointing process, multiple transactions on the private and permissioned blockchain network 1600 are combined into a single transaction and sent to the public blockchain network 1610.

The blockchain network 1600 may be network that offers faster transaction processing and lower fees. Such a blockchain network 1600 can operate in private, public, permissioned or unpermissioned modes in different embodiments. The blockchain network 1610 may be network that offers slower transaction processing and higher fees. Such a blockchain network 1610 can operate in private, public, permissioned or unpermissioned modes in different embodiments.

The benefit of this dual blockchain network approach is that it allows transaction processing in the absence of Internet connectivity at the vehicle and parking meter side, while enabling eventual consistency when Internet connection is available. Further, this dual blockchain approach can allow decoupling agreeing or honoring the transaction and the immediate payment. The basic assumption is that the payer (such as vehicle) and payee (such a parking meter) have IDs. A transaction has attributes such as time, place, cost, good exchanges, GPS, and an ID that is unique. Both parties agree to honor the transaction ID. The agreement can be automatic and optionally secured by a PIN. The payments follow immediately after the honor or later when the parties are disconnected. Through the dual blockchain approach, it is possible to decouple agreeing or honoring the transaction and the immediate payment because the coins in the wallet of the car cannot be double spent. The honoring step marks the coins as spent. The tokens or coins once reserved cannot be spent on anything other than the transaction ID for which they are reserved. The number of coins that a party (such as vehicle) can promise can be restricted based on past history and credit or prepaid and postpaid models. The payee (such as parking meter) receives a promise ID that they can use to track payments made to them by the payer (such as vehicle). The payer and payee signal to each other through the CarCoins contactless protocol exchanging IDs. A transaction ID and a Promise ID is generated and sent to the wallets of one or both the parties depending on the implementation model. Appropriate number of terms or coins are debited and/or credited to respective models depending on which of three models. Eventual consistency is achieved after the synchronization process is complete. For instance, credit and token balances are synchronized. If synchronization does not occur in 2 hours, 12 hours, 24 hours or 5 days, the transactions capabilities of the payer are suspended. The number of hours depends on credit history, number of coins spent and not synced, for instance.

Figure 22:
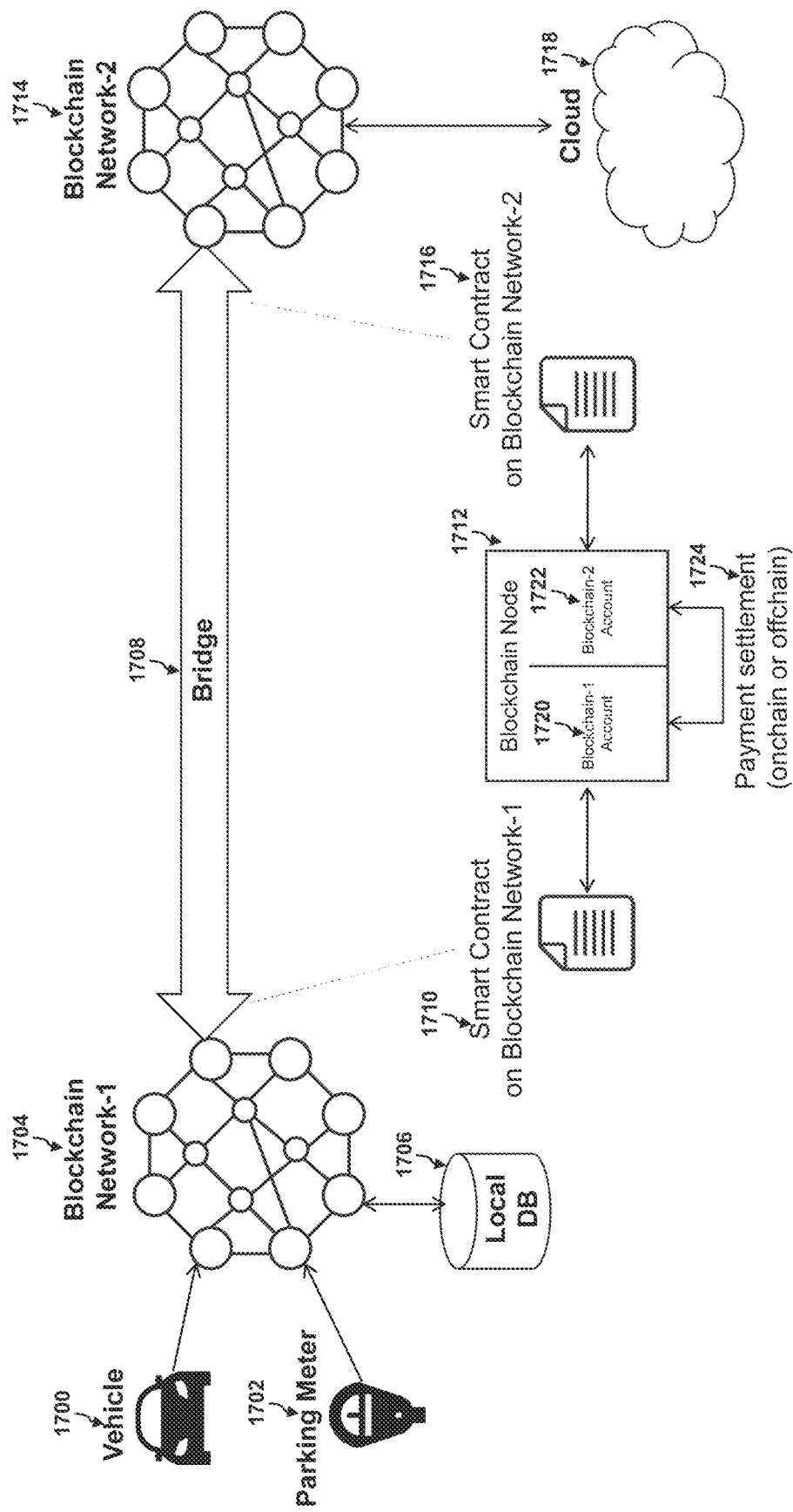
FIG. 22 is an illustration of on-chain and off-chain payment settlement processes within CarCoins system, according to an embodiment of the invention.

Referring to FIG. 22, an illustration of on-chain and off-chain payment settlement processes within CarCoins system, according to an embodiment of the invention is now described in detail. A bridge 1708 connects two blockchain networks 1704, 1714 and allows transactions to be forwarded from one blockchain network to another. A bridge 1708 may be implemented through a combination of blockchain accounts 1720, 1722, and smart contracts 1710, 1716 on the connected blockchain networks 1704, 1714, with on-chain or off-chain payment settlements 1724 between the blockchain accounts in a blockchain node 1712. The vehicle 1700 and parking meter 1702 transact with blockchain network 1704 and a local database 1706 is used for storing transaction data. Transactions on blockchain network 1714 may be stored in a cloud environment 1718.

Figure 23:
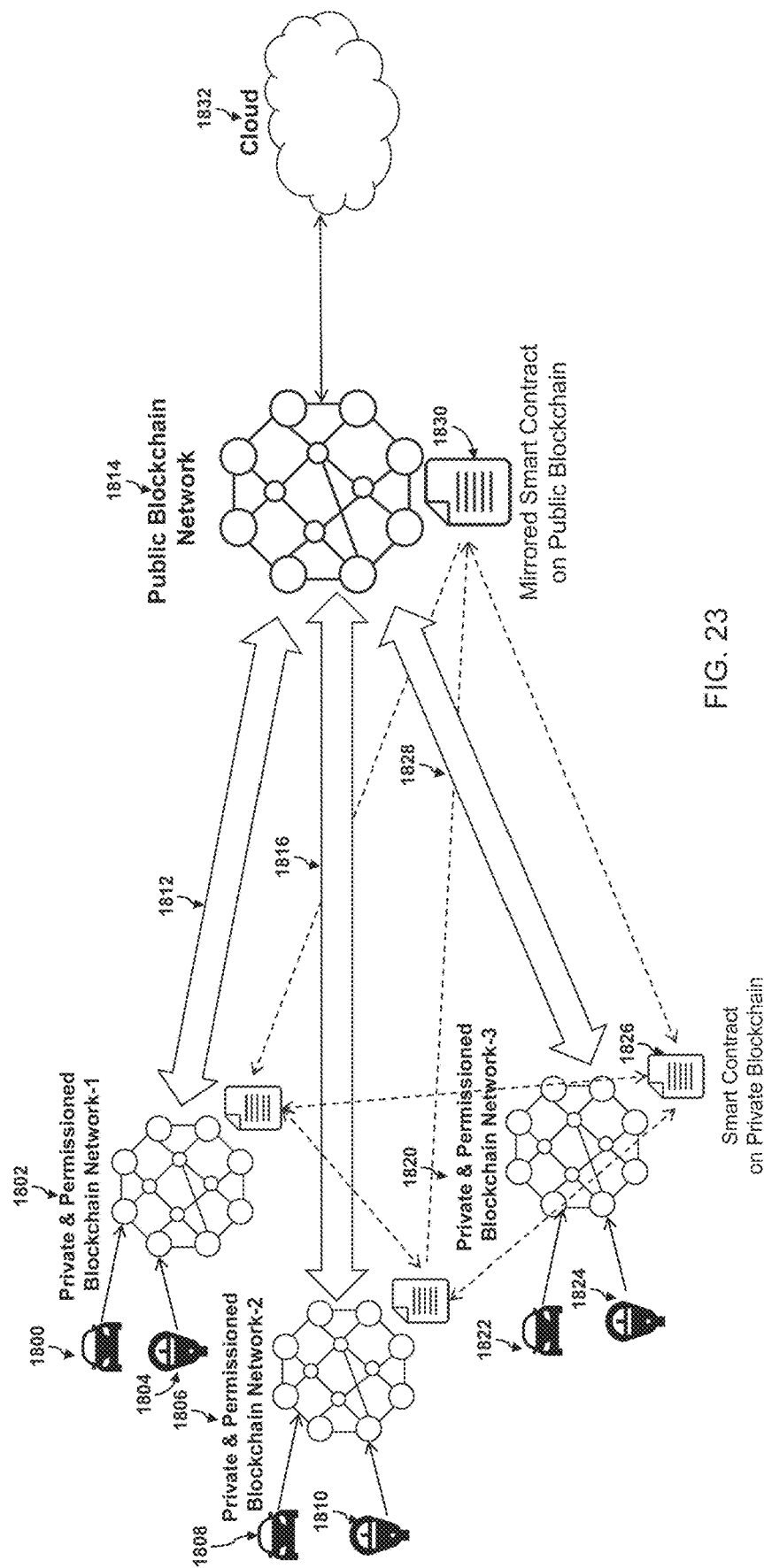
FIG. 23 is an illustration of the use of multiple chains for replication, partitioning & speedup within CarCoins system, according to an embodiment of the invention.

Referring to FIG. 23, an illustration of the use of multiple chains for replication, partitioning & speedup within CarCoins system, according to an embodiment of the invention is now described in detail. Private and permissioned blockchain networks 1802, 1806, 1820 have the same smart contract deployed at addresses and mirrored to the smart contract 1830 deployed on the public blockchain network

1814. Multiple private and permissioned blockchain networks are used for the purposes of replication, partitioning and transaction speedup. For example, in a payment application, all transactions between a first subset of vehicles and parking meters 1800, 1804 can be processed on private and permissioned blockchain network 1802, whereas transactions between a second subset of vehicles and parking meters 1808, 1810 can be processed on the private and permissioned blockchain network 1806, thus partitioning the transaction processing for the payment application across two blockchain. Any number of subsets of vehicles and parking meters 1822, 1824 and transactions therebetween being processed on a private and permissioned blockchain network 1820 is contemplated and included within the scope of the invention. Another use of having multiple private and permissioned blockchain networks 1802, 1806, 1820 to process transactions for an application is that while one network is being synchronized and checkpointed 1802, 1806, 1820 with the public blockchain network 1814, the transactions 1826 can be sent to the other private blockchain network to prevent double spending.

Figure 24:
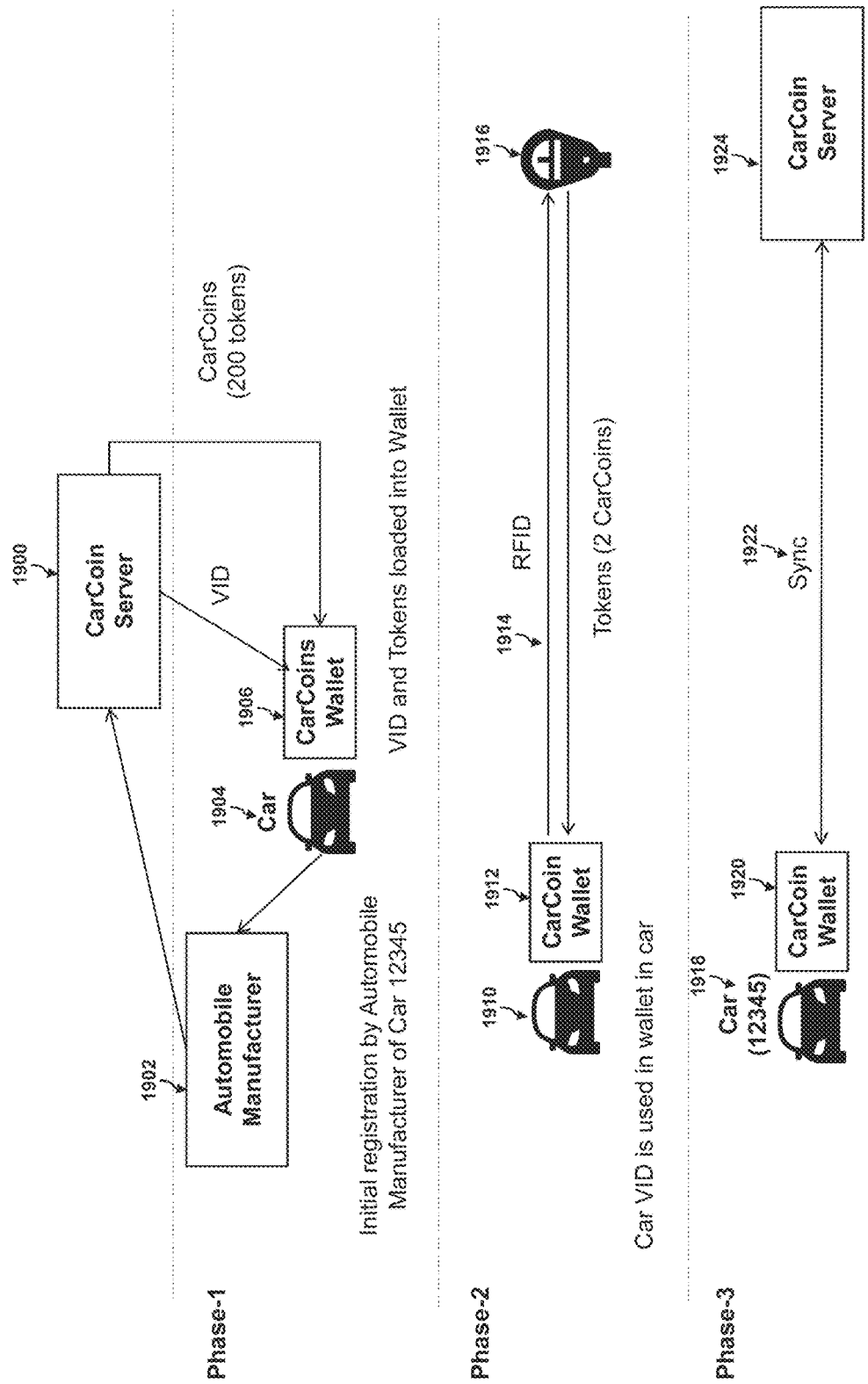
FIG. 24 is an illustration of the phases of an exemplary implementation CarCoins system, according to an embodiment of the invention.

Referring to FIG. 24, an illustration of the phases of an exemplary implementation of CarCoins system, according to an embodiment of the invention is now described in detail. In phase-1, the automobile manufacturer 1902 does the initial registration of the vehicle 1904 and creates a Vehicle ID (VID) on the blockchain. The VID is registered with a CarCoin server 1900 and the VID and tokens are loaded into the vehicle's wallet 1906. In phase-2, the car 1910 drives with CarCoin wallet 1912 and engages 1914 in disconnected payments with a parking meter 1916 using one of the implementation models described in FIGS. 15, 16, 17, 18 and 19. Phase-1 may be optionally part of phase-2 and performed primarily by car/driver (with some support from automotive supplier). In phase-3, the CarCoin wallet 1920 of car 1918 is synchronized with the CarCoin server 1924.

Figure 25:
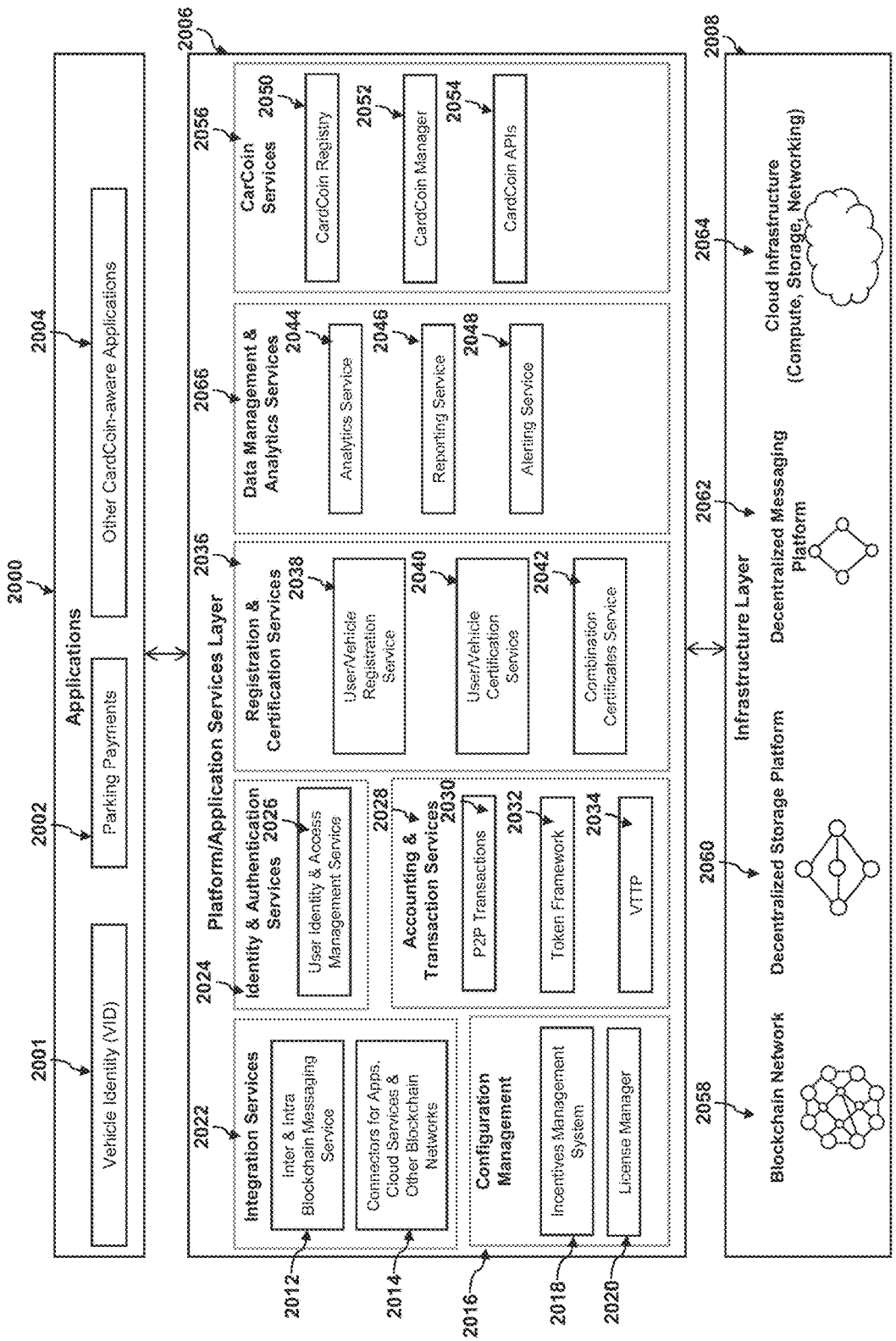
FIG. 25 is an illustration of the CarCoins technology stack, according to an embodiment of the invention.

Referring to FIG. 25, an illustration of the CarCoins technology stack, according to an embodiment of the invention is now described in detail. The CarCoin system's infrastructure layer 2008 comprises a blockchain network 2058, a decentralized storage platform 2060, decentralized messaging platform 2062 and cloud infrastructure 2064. All the smart contracts related to CarCoin system are deployed on the blockchain network 2058. For 2058, a blockchain platform such as Ethereum can be used. The decentralized messaging platform 2062 is used for messaging between the decentralized applications (Dapps), which are built on the CarCoin system. For 2062, a decentralized messaging platform such as Whisper, can be used. The decentralized storage platform 2060 is used for storing vehicle data. For 2060, a decentralized storage platform such as Swarm can be used. The cloud infrastructure 2064, is used for collection, storage and analysis of application usage data The CarCoin system's platform and application services layer 2006 comprises Integration Services 2022, Identity & Authentication Services 2024, Registration & Certification Services 2036, Data Management & Analytics Services 2066, CarCoin Services 2056, Configuration Management services 2016 and Accounting & Transaction Services 2028. The Integration Services 2022, comprise Inter-Blockchain and Intra-blockchain Messaging Services 2012, and various connectors for applications, cloud services and other blockchain networks 2014. The Identity & Authentication Services 2024 comprise a User Identity & Access Management Service 2026. The Registration & Certification Services 2036 comprise a User/Vehicle Registration Service 2038, User/Vehicle Certification Service 2040 and a Combination Certificates Service 2042. The Data Management & Analytics Services 2066, are deployed on the cloud infrastructure 2064. These include an analytics service 2044, reporting service 2046, and an alerting service 2048. The analytics service 2044, can analyze multi-blockchain behavior of a user/vehicle account to ensure compliance.

The CarCoin Services 2056 includes CardCoin Registry 2050, CardCoin Manager 2052 and CardCoin APIs 2054. Configuration Management services 2016 include Incentives Management System 2018 and License Manager 2020. Accounting & Transaction Services include P2P Transactions 2030, Token Framework 2032 and VTTP service (Value Token Transfer Protocol) 2034. It is contemplated and included within the scope of the invention that all of these platforms and applications services are operable on a computerized device comprising a processor, a network communication device, and a data storage device as described hereinabove.

The CarCoin system can be used for providing identity, access management, authentication services and payment services for a vehicles. Some exemplary applications 2000 that can benefit from the CarCoin system include an vehicle identity (VID) application 2001, a parking payments application 2002 and other CardCoin-aware applications 2004.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

What is claimed is:

1. A system for blockchain-based unique identifiers and decentralized payments comprising:
   a first computerized system comprising:
      a first controller;
      a unique identifier; and
      a first wireless communication device;
   a second computerized system comprising:
      a second wireless communication device; and
      a gateway device configured to:
         communicate with a first blockchain network via the second wireless communication device;
         receive the unique identifier from the first computerized system;
         generate a transaction to transfer a token value from a wallet associated with one of the first computerized system and the second computerized system, defining a spending wallet, to a wallet associated with the other of the first computerized system and the second computerized system, defining a receiving wallet, responsive to receiving the unique identifier, the transaction being defined as a generated transaction;
         synchronize the generated transaction to the first blockchain network; and
         perform a checkpointing process to synchronize transactions synchronized to the first blockchain network to a second blockchain network, the checkpointing process comprising:
            processing a plurality of transactions, the plurality of transactions comprising the generated transaction, on the first blockchain network;
            combining the plurality of transactions into a single combined transaction; and
            sending the single combined transaction to the second blockchain network;
   wherein one of the first computerized system and the second computerized system is installed in a vehicle;
   wherein the other of the first computerized system and the second computerized system is installed in a fixed structure; and
   wherein the first blockchain network processes transactions faster and with lower fees than the second blockchain network.

2. The system of claim 1 wherein:
   the first computerized system comprises a short-range wireless device that is one of passive and battery-assisted passive, defining a UID device, and configured to transmit the unique identifier responsive to receiving a short-range signal seeking the unique identifier, defining an interrogator signal;
   the second computerized system comprises a second controller operable to:
      transmit the interrogator signal;
      receive the signal from the UID device; and
      transmit the unique identifier to the gateway device.

3. The system of claim 2 wherein:
   the UID device is at least one of an RFID tag, an NFC tag, and a BLE tag; and
   the second controller comprises at least one of an RFID reader, an NFC reader, and a BLE reader.

4. The system of claim 2 wherein:
   the second controller is positioned within a vehicle parking indicator and further comprises a first network communication device;
   the gateway device is positioned within a geographical area delineating a vehicle parking area and comprising the vehicle parking indicator, defining a gateway location, the gateway device comprising a second network communication device configured to communicate with the first network communication device and receive the unique identifier thereby; and
   the second wireless communication device is positioned at one of the vehicle parking indicator and the gateway location.

5. The system of claim 4 wherein:
   the second wireless communication device is positioned at the gateway location;
   the second computerized system comprises a third wireless communication device positioned at the vehicle parking indicator; and
   the gateway device is further operable to synchronize the generated transaction to the blockchain network via at least one of the second wireless communication device and the third wireless communication device.

6. The system of claim 1 wherein the gateway device is configured to operate a node of the blockchain network.

7. The system of claim 6 wherein the gateway device is configured to:
   maintain a local database of messages and tokens exchanged between the first computerized system and the second computerized system; and
   synchronize the local database with the blockchain network.

8. The system of claim 1 wherein the first controller, the unique identifier, and the first wireless communication device are comprised by a computerized device comprised by a vehicle, defining a vehicle computerized device.

9. The system of claim 8 wherein:
   the vehicle computerized device further comprises a short-range wireless communication device configured to transmit the unique identifier; and
   the gateway device comprises a wireless communication device configured to receive the unique identifier from the wireless communication device comprised by the vehicle computerized device.

10. The system of claim 1 wherein:
    the first blockchain network is a private permissioned blockchain network; and
    the second blockchain network is a public blockchain network.

11. The system of claim 1 wherein the checkpointing process further comprises transmitting the generated transaction to a third blockchain network.

12. The system of claim 1 wherein:
    the generated transaction further comprises:
       a second unique identifier identifying the second computerized device; and
       a transaction ID; and
    the checkpoint process further comprises:
       marking a token comprised by the spending wallet as being spent, thereby precluding the token from being spent in another transaction comprising a transaction ID that differs from the transaction ID of the generated transaction.

13. The system of claim 1 wherein the gateway device is configured to synchronize the generated transaction to the blockchain network using a cloud-based oracle.

14. The system of claim 1 wherein the gateway is positioned in a geographic area delineated as at least one of a stand-alone vehicle parking area, a vehicle parking area associated with a building, and a toll collection area.

15. A decentralized payment method for blockchain-based unique identifiers comprising:
generating a short-range wireless interrogator signal using a first short-range wireless transceiver device;
receiving a response to the short-range wireless interrogator signal comprising a unique identifier;
generating a transaction to transfer a token value from a wallet associated with a vehicle on a first blockchain network to a receiving wallet, defining a generated transaction by a gateway device;
synchronizing the generated transaction to the first blockchain network via a first wireless communication device; and
performing a checkpointing process to synchronize transactions synchronized to the first blockchain network to a second blockchain network, the checkpointing process comprising:
processing a plurality of transactions, the plurality of transactions comprising the generated transaction, on the first blockchain network;
combining the plurality of transactions into a single combined transaction; and
sending the single combined transaction to the second blockchain network;
wherein the first blockchain network processes transactions faster and with lower fees than the second blockchain network.

16. The method of claim 15 wherein:
the gateway device operates a node on the first blockchain network; and
synchronizing the generated transaction comprises publishing the transaction on the first blockchain network.

17. The method of claim 16 wherein:
the gateway device maintains a local database of messages and tokens exchanged between the gateway device and vehicles interacting therewith;
synchronizing the generated transaction comprises synchronizing the local database with the blockchain network; and
the method further comprises adding the generated transaction to the local database.

18. The method of claim 15 wherein:
the first blockchain network is a permissioned private blockchain network; and
the second blockchain network is a public blockchain network.

19. A system for blockchain-based unique identifiers and decentralized payments comprising:
a vehicle computerized system installed in a vehicle and comprising:
a first controller;
a vehicle identifier;
a first short-range wireless device configured to transmit a signal providing the vehicle identifier, defining a VID signal, responsive to receiving a short-range signal seeking the vehicle identifier, defining an interrogator signal; and
a first wireless communication device;
a receiving computerized system installed in a fixed structure and comprising:
a second short-range wireless device configured to transmit the interrogator signal and receive the VID signal from the first short-range wireless device;
a second wireless communication device; and
a gateway device configured to:
communicate with a first blockchain network via the second wireless communication device;
generate a transaction to transfer a token value from a wallet associated with the vehicle computerized system to a wallet associated with the receiving computerized system, defining a generated transaction; and
synchronize the generated transaction to the first blockchain network; and
perform a checkpointing process to synchronize transactions synchronized to the first blockchain network to a second blockchain network, the checkpointing process comprising:
processing a plurality of transactions, the plurality of transactions comprising the generated transaction, on the first blockchain network;
combining the plurality of transactions into a single combined transaction; and
sending the single combined transaction to the second blockchain network;
wherein the first blockchain network processes transactions faster and with lower fees than the second blockchain network.

20. The system of claim 19 wherein the gateway device is further configured to:
operate a node of the blockchain network;
maintain a local database of messages and tokens exchanged between the vehicle computerized system and the receiving computerized system;
add the generated transaction to the local database; and
synchronize the local database with the blockchain network.

21. The system of claim 19 wherein:
the first blockchain network is a private permissioned blockchain network; and
the second blockchain network is a public blockchain network.

22. The system of claim 19 wherein:
the second short-range wireless device is positioned within a vehicle parking indicator and further comprises a first network communication device;
the gateway device is positioned within a geographical area delineating a vehicle parking area and comprising the vehicle parking indicator, defining a gateway location, the gateway device comprising a second network communication device configured to communicate with the first network communication device and receive the vehicle identifier thereby; and
the second wireless communication device is positioned at one of the vehicle parking indicator and the gateway location.

* * * * *